Figure 10:
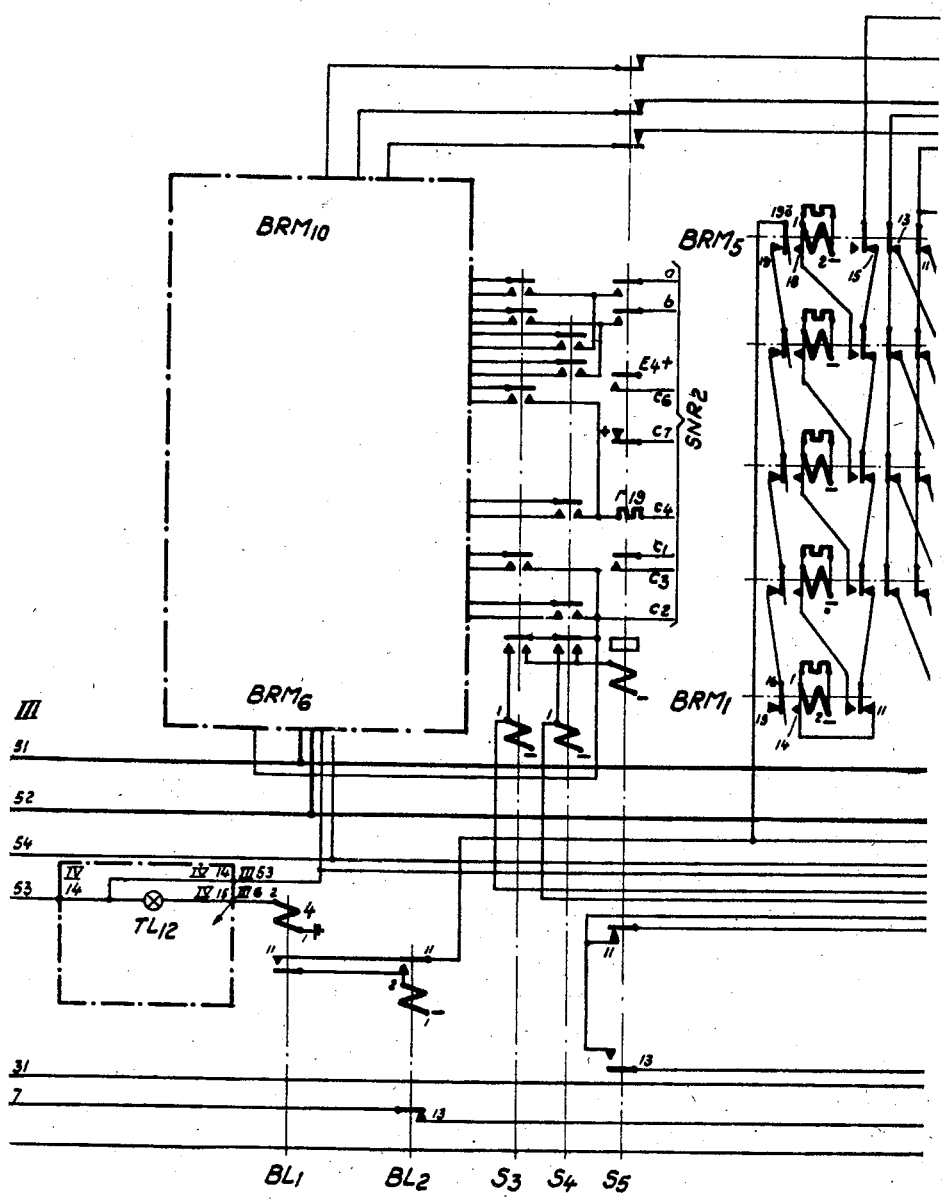
Figure 11:
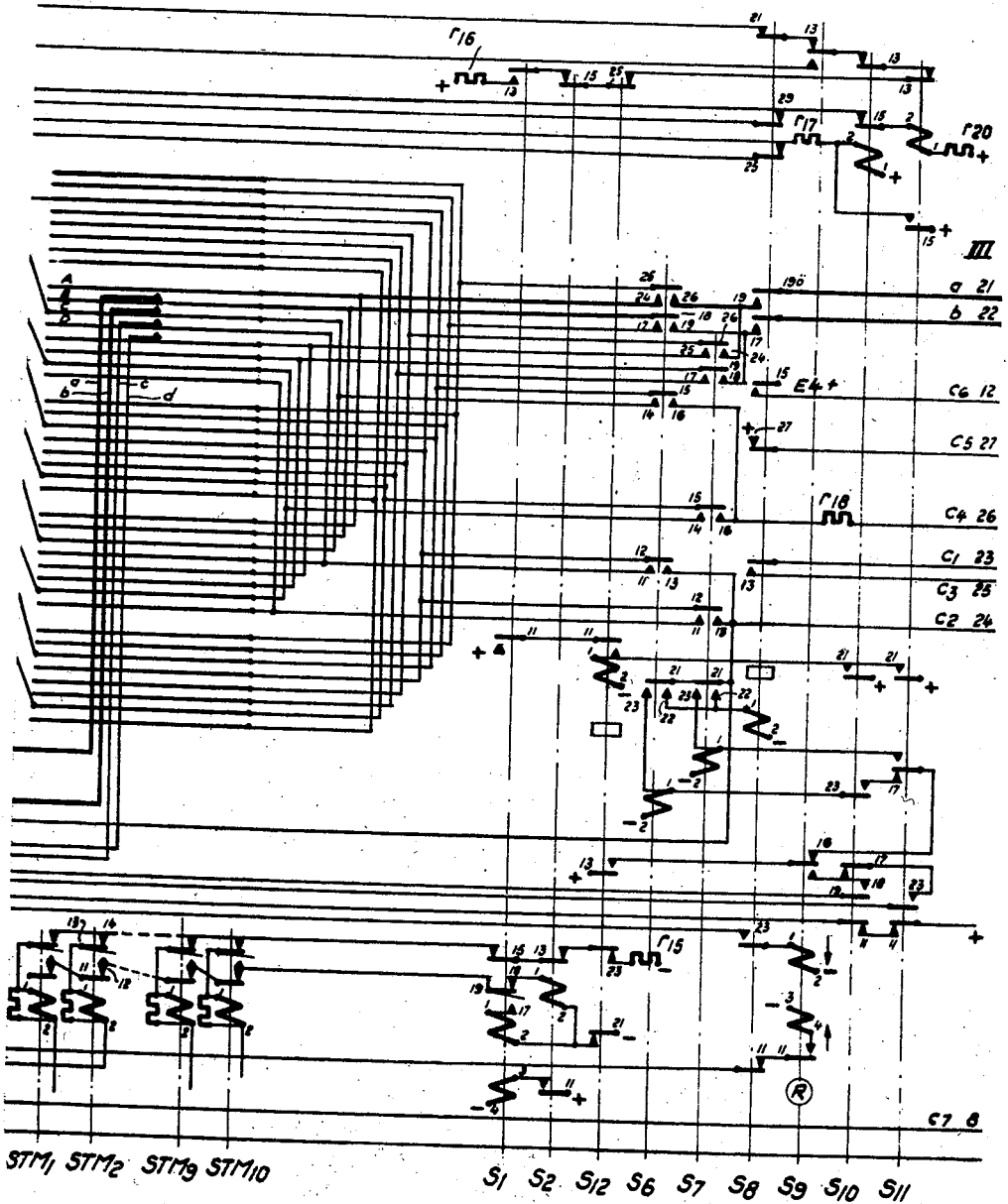
Figure 12:
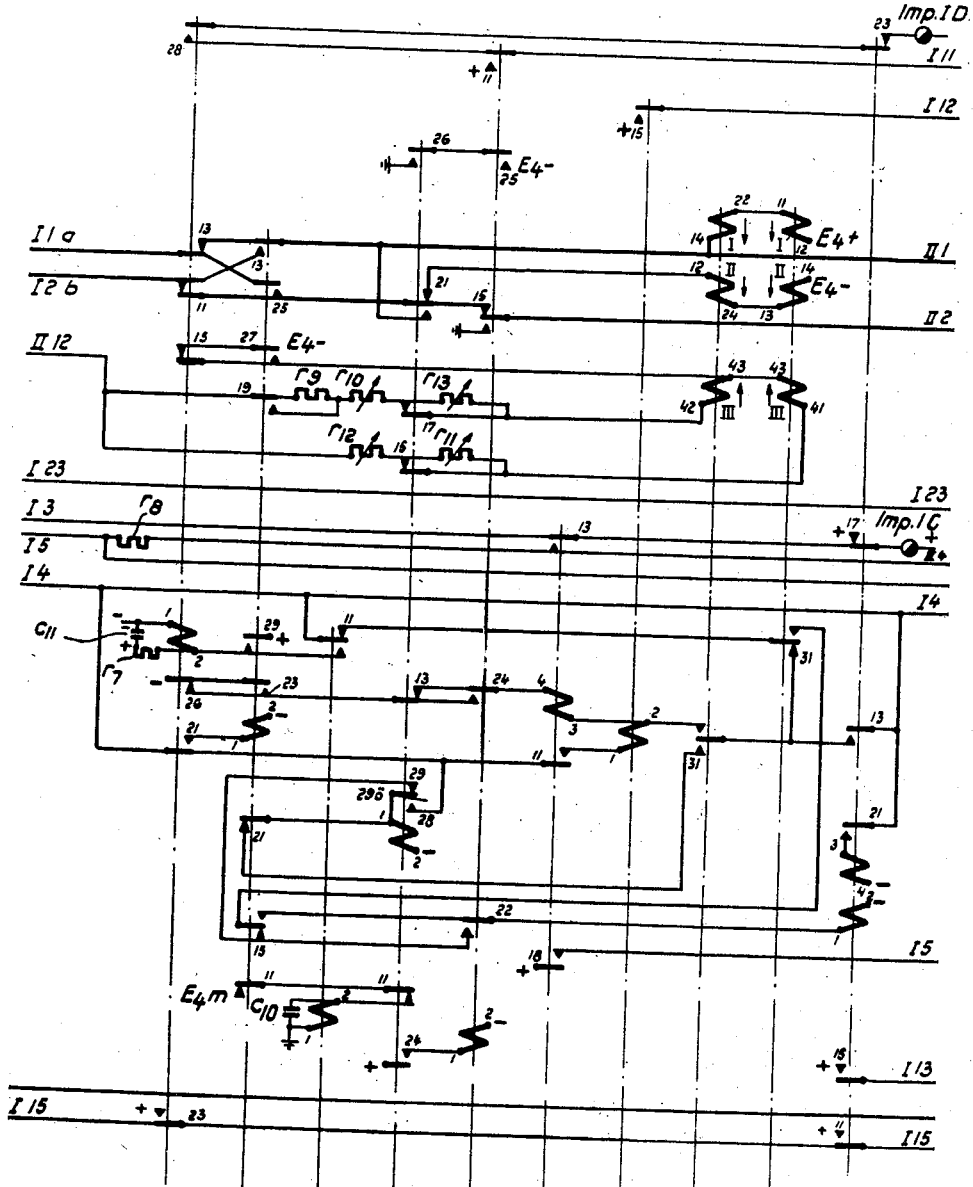
Figure 13:
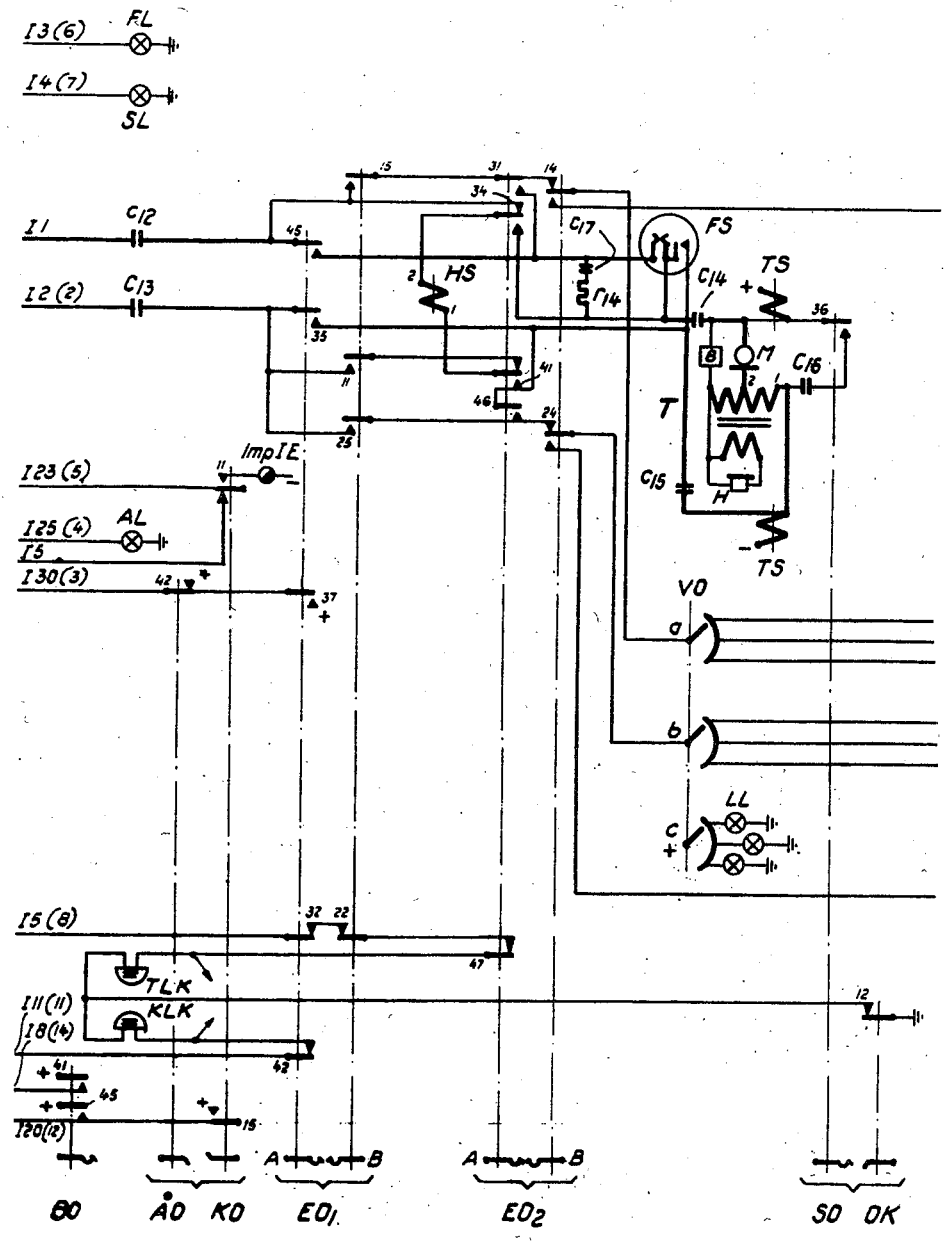
Figure 15:
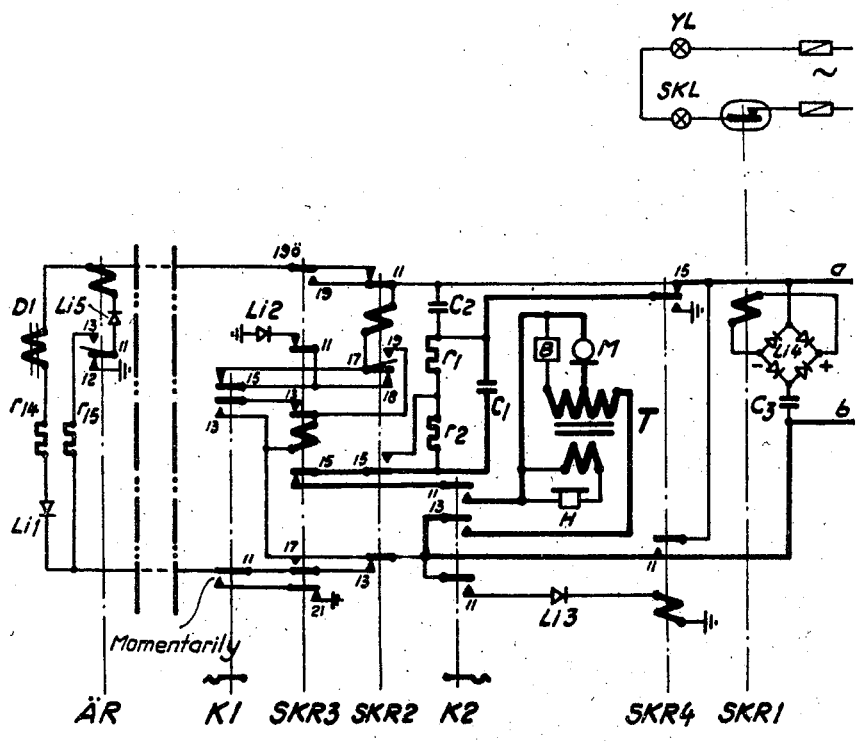
Figure 16:
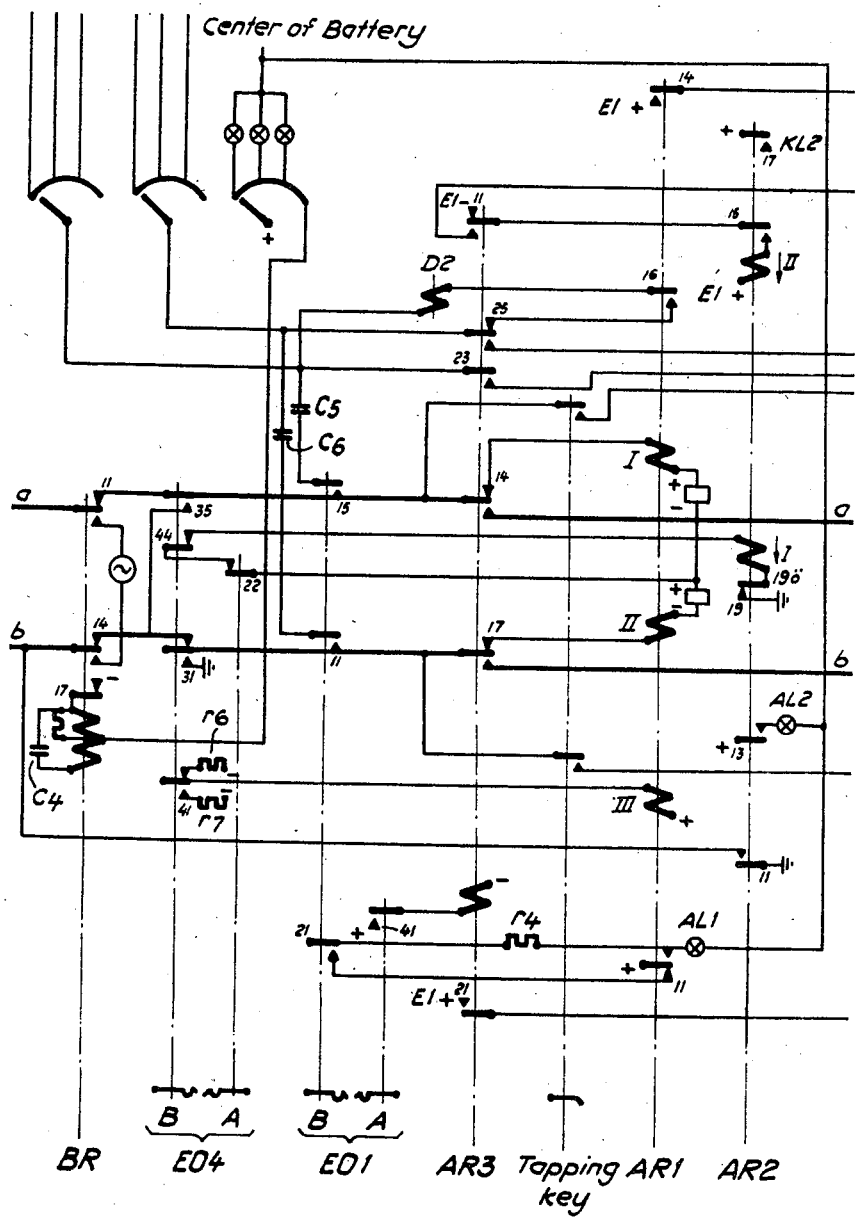

Jan. 14, 1958  E. L. SKOGSBERG  2,820,098
SIGNALING SYSTEM
Filed March 19, 1952  19 Sheets-Sheet 1
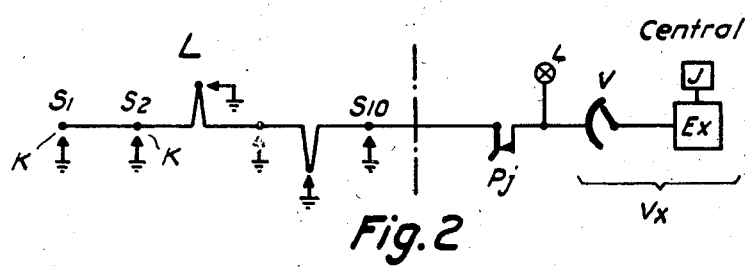
Fig. 2
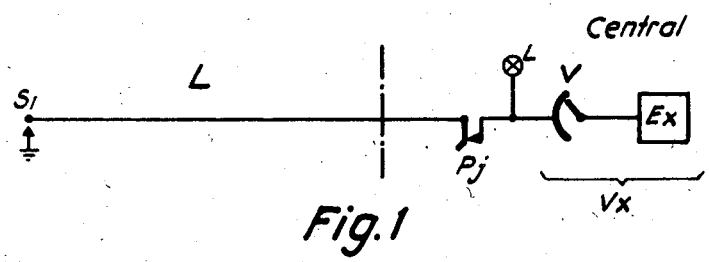
Fig. 1
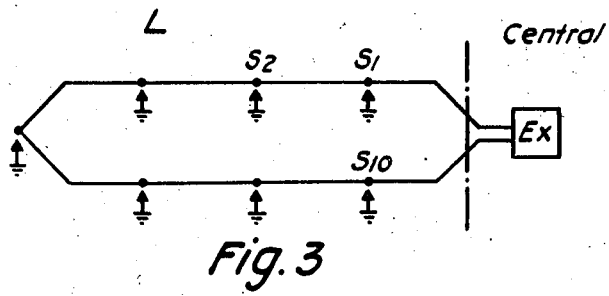
Fig. 3
| Fig. 8 | Fig. 9 | Fig. 10 | Fig. 11 | Fig. 12 | Fig. 13 |
|---|---|---|---|---|---|
Fig. 4
| Fig. 15 | Fig. 16 | Fig. 17 | Fig. 18 |
|---|---|---|---|
Fig. 5
INVENTOR:
ERIK LENNART SKOGSBERG
BY Richardson, David and Nordon
ATTORNEYS Jan. 14, 1958

E. L. SKOGSBERG 2,820,098

SIGNALING SYSTEM

Filed March 19, 1952

19 Sheets-Sheet 5

INVENTOR:
ERIK LENNART SKOGSBERG

BY
Richardson, David and Nordon
ATTORNEYS

Jan. 14, 1958   E. L. SKOGSBERG   2,820,098
SIGNALING SYSTEM
Filed March 19, 1952   19 Sheets-Sheet 6

INVENTOR:
ERIK LENNART SKOGSBERG
BY Richardson, David and Nordon
ATTORNEYS

Jan. 14, 1958

E. L. SKOGSBERG 2,820,098

SIGNALING SYSTEM

Filed March 19, 1952

19 Sheets-Sheet 7

INVENTOR:
ERIK LENNART SKOGSBERG
BY
Richardson, David and Nordon
ATTORNEYS

Jan. 14, 1958     E. L. SKOGSBERG     2,820,098
SIGNALING SYSTEM

Filed March 19, 1952     19 Sheets-Sheet 10

INVENTOR:
ERIK LENNART SKOGSBERG
BY Richardson, David and Nordon
ATTORNEYS

Jan. 14, 1958

E. L. SKOGSBERG 2,820,098

SIGNALING SYSTEM

Filed March 19, 1952

19 Sheets-Sheet 11

INVENTOR:
ERIK LENNART SKOGSBERG
BY
Richardson, David and Nerdon
ATTORNEYS

Jan. 14, 1958

E. L. SKOGSBERG 2,820,098

SIGNALING SYSTEM

Filed March 19, 1952

19 Sheets-Sheet 12

INVENTOR:
ERIK LENNART SKOGSBERG

BY
Richardson, David and Nordon
ATTORNEYS

Jan. 14, 1958  E. L. SKOGSBERG  2,820,098
SIGNALING SYSTEM
Filed March 19, 1952  19 Sheets-Sheet 14

INVENTOR:
ERIK LENNART SKOGSBERG
BY
Richardson, David and Nordon
ATTORNEYS

Jan. 14, 1958 E. L. SKOGSBERG 2,820,098
SIGNALING SYSTEM
Filed March 19, 1952 19 Sheets-Sheet 15

INVENTOR:
ERIK LENNART SKOGSBERG
BY
Richardson, David and Nordon
ATTORNEYS

INVENTOR:
ERIK LENNART SKOGSBERG

Jan. 14, 1958   E. L. SKOGSBERG   2,820,098
SIGNALING SYSTEM
Filed March 19, 1952   19 Sheets-Sheet 18

INVENTOR:
ERIK LENNART SKOGSBERG
BY
Richardson, David and Nordon
ATTORNEYS

United States Patent Office 2,820,098
Patented Jan. 14, 1958

2,820,098

SIGNALING SYSTEM

Erik Lennart Skogsberg, Huddinge, Sweden

Application March 19, 1952, Serial No. 277,345

6 Claims. (Cl. 179—5)

The present invention relates to a signaling and telephone system for police and fire brigades.

In a signaling system of this type, a number of alarm telephone apparatuses, for example in the form of street boxes, are connected to an operator position by a number of lines. The operator position is provided with means for identifying calling alarm telephone apparatuses and means for establishing communication between the same and an operator and preferably also for establishing connection with subscribers at other telephone exchanges. Furthermore, a system of this type must be very dependable and therefore the lines should be controlled by rest current. In case of a line fault, this immediately releases an alarm signal at the central installation.

One of the objects of the invention is to provide for an immediate indication at the central installation in case of a line fault and to make it possible to establish connection between a calling apparatus and the central installation, irrespective of whether the line is functioning normally or a line fault is at hand. Another object of the invention is to permit connection of a number of alarm telephone apparatuses to each line and to supply means by which any calling apparatus can be identified at the central installation.

An additional object of the invention is to provide arrangements for two different signals from the calling apparatuses and their indication in different ways at the central installation.

The system is furthermore characterized by the following advantages:

The central installation is equipped with certain alarm and control devices common to all alarm boxes.

With different forms of line faults, including open box doors and locking handles that have only been partially actuated, a ringing signal is obtained. The faults are also indicated by a special lamp; one for each line.

The current in the line branches and current to ground are measured by an instrument in the central installation. The instrument also shows the intensity of the rest current, the direct current resistance in the telephone equipment (alarm boxes), a break in the line, a short-circuit between the branches in a line, leakage between the $a$-branch or $b$-branch and ground, also the battery voltage, charging current and discharge current etc.

The system normally works with current from the lighting network. In case of a net breakdown, the battery included in the installation is connected automatically and then takes over the current supply.

An arrangement for police flash signals can be connected.

Service calls, emergency calls and fault signals can be carried forward from the central installation to an installation at another place.

Manual or automatic operation of the alarm devices, such as sirens, bells to alarm voluntary firemen etc. can be arranged.

The central installation can be combined with a loudspeaker equipment.

The system may be combined with a radio installation.

Speech- and time-recording equipment can be connected to the central installation, and come into operation in the event of an emergency call, for example.

Automatic fire alarm devices may be connected. It should be noted that they need not be provided either with alarm or fault indicating mechanisms.

The use for the alarm devices, provided for in this invention, is not, however, restricted solely to the fire and police service. Constantly increasing demands have been made in the course of years on communal services, for rapid intervention in case of emergencies of various kinds. Thus, in large and medium-sized cities and towns facilities must be available in the streets for calling an ambulance. With regard to the police, it is also desirable that patroling policemen can be called from the station by "flash" signaling from an indicating lamp which should be installed on each alarm box. Similarly, a need exists for repair personnel attached to various communal services, such as the communications, water and electricity works, to establish connection quickly with their respective departments. It is obvious that this is not possible with the alarm system employed hitherto. Also in these cases the telephone must be used. Attempts have actually been made in this direction, but only in a form supplementary to the ordinary fire telegraph installations. Thus, a system suitable for all emergency requirements has not been devised hitherto.

Three different applications of this invention are outlined in the following. One application as in rough outline is shown by Fig. 1 with a direct double-wire line from each alarm box to the central station. A second, according to Fig. 2, permitting the connection of a number of alarm boxes to the same double-wire line; and a third, according to Fig. 3, employing a single-wire line in the form of a loop, to which a number of alarm boxes can be connected.

The three applications are substantially similar from a technical point of view, but the line costs are of course considerably higher for the system shown by Fig. 1. The difference in the line length between the applications according to Figs. 1 and 2 is in the neighbourhood of 80%. On the other hand, the costs for the equipment of the boxes is somewhat higher for the system shown by Fig. 2. Owing to the low line costs, the system according to Fig. 1 will be most advantageous from an economic point of view except in cases where only very short lines are required.

As in the case of the fire alarm telegraph system, it is absolutely essential that individual indication for emergency calls from each calling box should be included in the central station equipment. As regards the application shown by Fig. 1 with its direct lines from every alarm box no difficulties are experienced in this respect. As regards the other two applications, however, in which a number of boxes are connected to the same line the conditions are different, and the difficulties encountered in meeting this and all other demands have been considerable. The solution of the problem, which is both simple and natural, is based on an entirely new principle in relay technique.

As may be seen from Fig. 1, the box S1 is connected in a line L which passes from the central station. This is of the double wire type. The box is further provided with contact arrangements for connecting the line to ground. This connection is employed both for indicating emergency calls to the central and also in the event of line faults (breakdown in one branch line or shortcircuit between the branches) to connect the speech equipment of the box between the branches and ground so that calls can be made via the ground. Special precautions have been taken in this respect to reduce disturbances.

The actual exchange equipment Vx consists of a selector device V, with corresponding operating relays, a dispatching arrangement Ex in the form of a desk, a lamp panel L. The exchange equipment is normally designed for simultaneous progressing calls from each line to other telephones, or if required, to another exchange. This "cordless" type of exchange has been chosen because the standard type is not considered to offer the speed and reliability necessary for this particular use.

In order to make a service call the door of the alarm box is opened with a key. The person making the call lifts the microtelephone, whereupon a signal is received at the central installation by the ringing of a bell and lighting up of a lamp on the lamp panel indicating the line for the alarm box concerned, another lamp lighting up to indicate where the call is connected by the selector. The operator at the central installation throws over a connecting switch and is thus able to communicate with the person calling. If the caller wants to be connected to a telephone having a direct line to the central installation, this line is connected by a line switch, whereupon the operator throws over the connecting switch in its second position. In this way connection is established between the caller and the desired telephone apparatus. The operator is able to control and supervise the call without disturbing the persons speaking.

If the caller desires to communicate with a telephone apparatus connected to the telephone station, the operator rings up this apparatus via the telephone exchange. On receiving an answer, the operator informs the subscriber that the call is being made from an alarm box. Communication is then established in the manner described in the previous paragraph.

When the person telephoning has finished his conversation with the subscriber concerned and replaces the microtelephone in its position, the lamps in the central installation previously referred to are extinguished. The operator then returns the line throw-over switch to the position of rest. If the connection has been established through an automatic exchange or a manually operated exchange according to the central battery exchange system, an automatic ring-off signal is received at the exchange when the person telephoning from the alarm box replaces the microphone in its position. Where the exchange is designed on the local battery exchange system, the exchange receives a final signal when the called subscriber rings off. Since, as is well-known, carelessness is apt to occur in this respect, it is necessary to instruct the operator to give a final signal after the lamps in the central installation have been extinguished.

For emergency calls the door of the alarm box is opened by the door-handle. A special bell signal is then received at the central installation and a lamp lights up on the lamp panel. The lamp is common to all boxes connected to the line. When the operator's throw-over switch is actuated, the position or number of the alarm box is indicated on the lamp panel. As soon as this has been done the operator is in speech connection with the person sending the alarm. After the emergency call has been put through and the person sending it has replaced the microtelephone in its position, the calling lamp in the central installation is extinguished, and on closing the door of the box all remaining lamps are extinguished.

Already when the door-handle is actuated, an emergency signal is received and it is known from which box the call is being made. All this takes place even before the caller has had time to lift the microtelephone from its position. If the operator is not always present at the central installation it is obviously of the greatest importance that the alarm is given before the caller has been able to lift the microtelephone. This will give the operator time to connect himself and be prepared to receive the call at the same time as the caller is lifting the microtelephone.

A bell signal is also received in the event of faults of different kinds, such as when the door of the box has been left open without an emergency call being made or when the door-handle has only been partially actuated.

It should further be noted that the telephone equipment in the alarm box may be provided with a bell, thus enabling the box to be used also for incoming calls. The box can consequently be rung up from the central station. This may be important with respect to service calls if the caller cannot obtain the required information immediately but must be called back, for example after certain investigations have been made.

The system also functions in case of a break in one of the line branches, shortcircuit between the branches or in case of ground faults. This is achieved with the help of a relay installed in the alarm box, which connects the speech equipment between the branches and ground. The relay may be employed for so-called police flash signals.

The application as shown by Fig. 2 is mainly similar to Fig. 1 but differs in that a number of boxes S1, S2, up to S10 are connected to each line, L, and that all identification devices J are arranged in the central for identification of a calling box in the line. It should also be pointed out that when a service call is in progress and it is necessary to use the alarm box for an emergency call, this call is initiated in the same manner as in Fig. 1. If the service call is connected to a telephone outside the central station, the emergency call is nevertheless received at the central station.

The application according to Fig. 3 is substantially similar to Fig. 2 and therefore reference should be made to the complete technical description for particulars of the differences. The main difference, however, is that the line consists of a single wire line loop. Consequently, each line is provided with an operation device and an identification device.

Calls are connected and conversation can be carried on even with a break in the line or a ground leakage. As there is only one branch line, short circuiting cannot occur.

Figure 6:
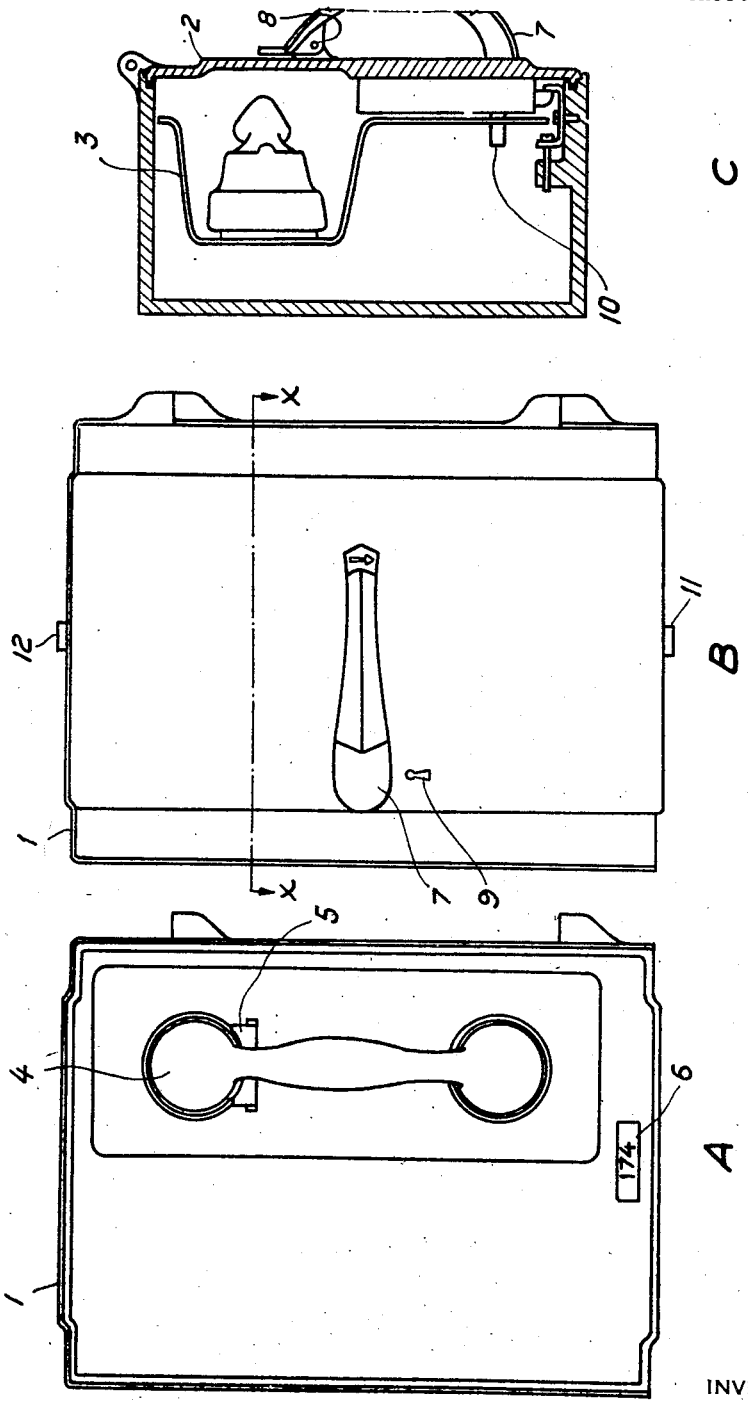
Figure 14:
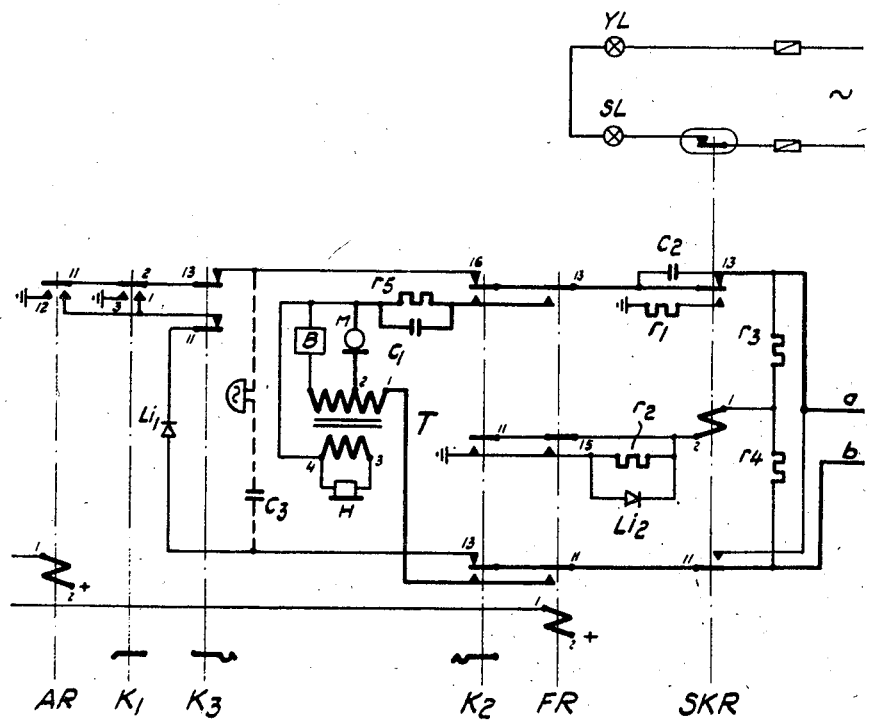

Fig. 6 shows an alarm box according to the invention. In the following detailed description, what regards the application as shown by Fig. 1, reference is made to the drawings according to Figures 8–13, which are matched to each other as shown by Fig. 4. Fig. 14 shows a diagram of a device for automatic transmission of a fire alarm. The application as mentioned above with regard to Fig. 2, is shown in detail in the drawings according to Figs. 15 to 18. These drawings should be matched to each other as shown by Fig. 5. The application according to Fig. 3 is shown in detail by Fig. 19.

Figure 20:
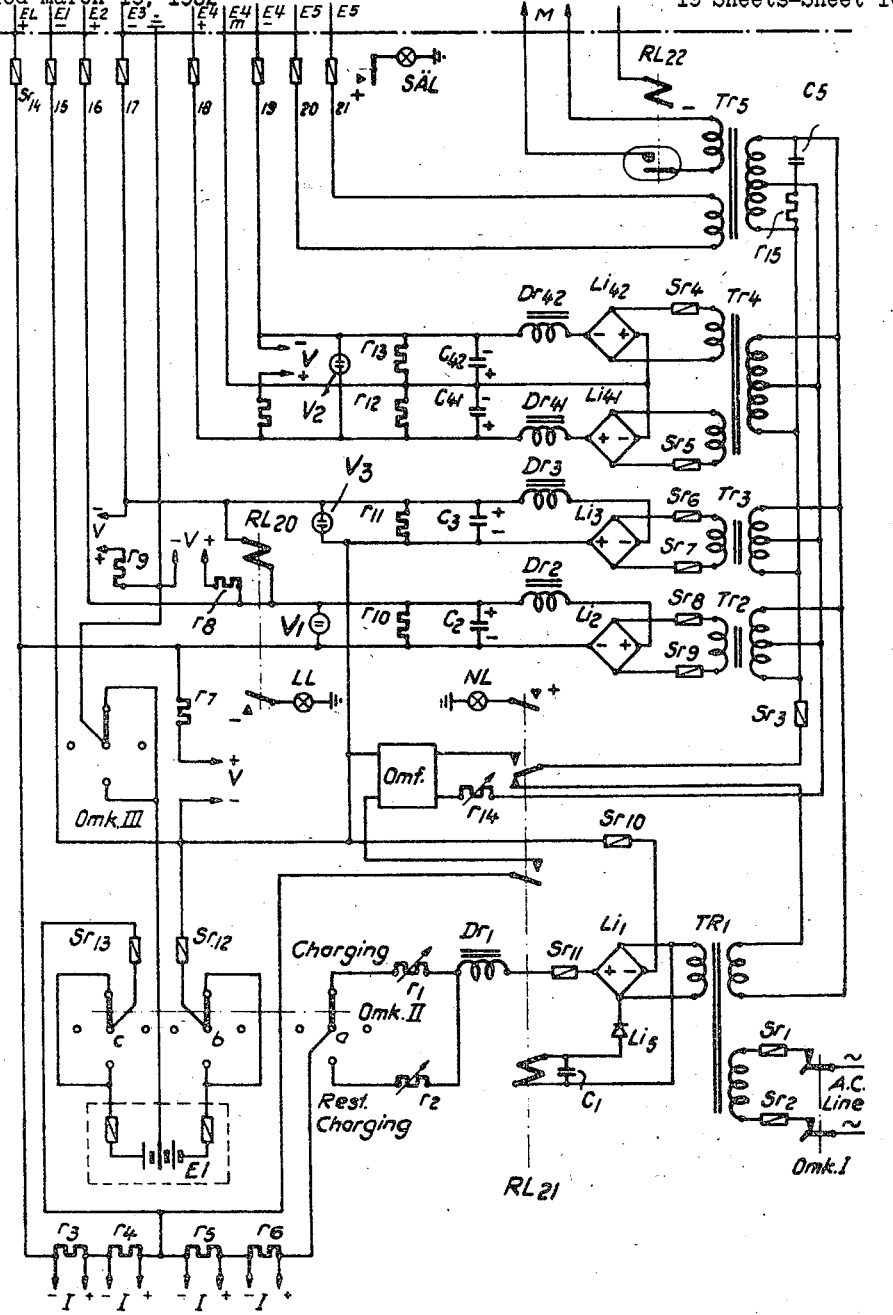
Figure 21:
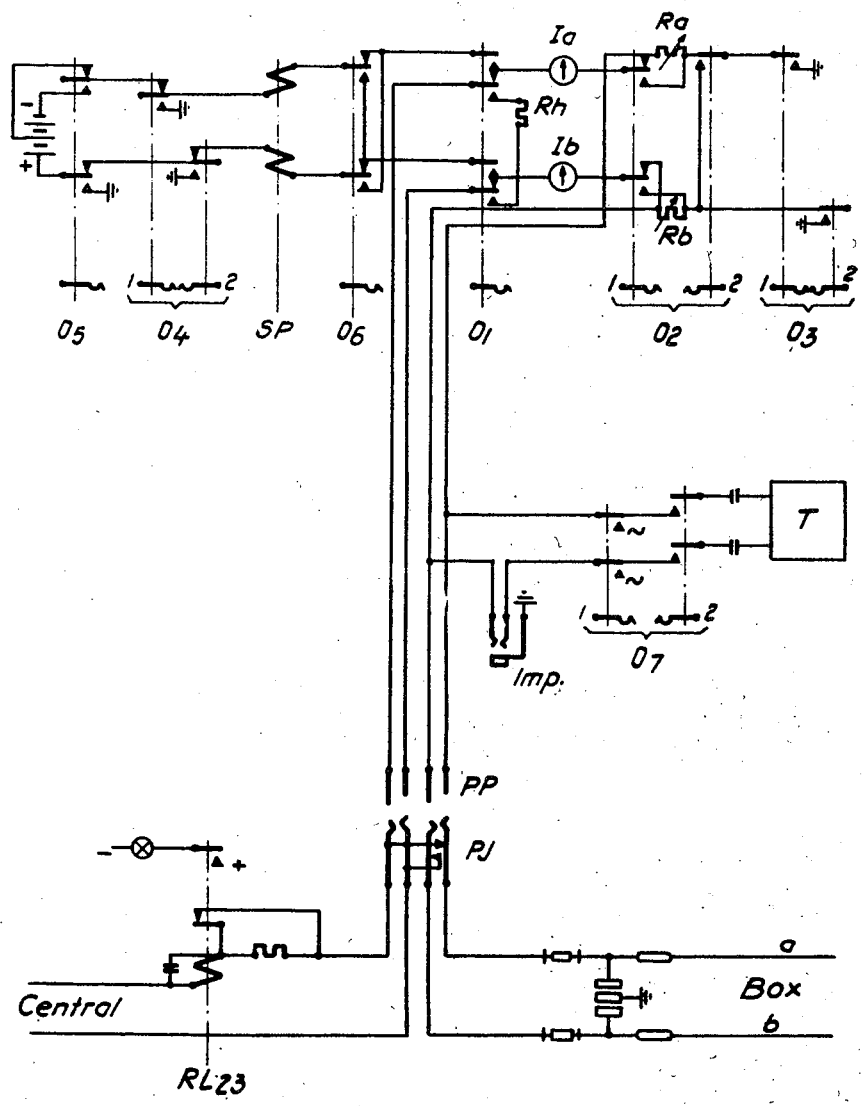

Fig. 20 gives an example of a current supply device for the system according to the invention. Fig. 21 shows a test device for testing the equipment according to the invention.

Figure 22:
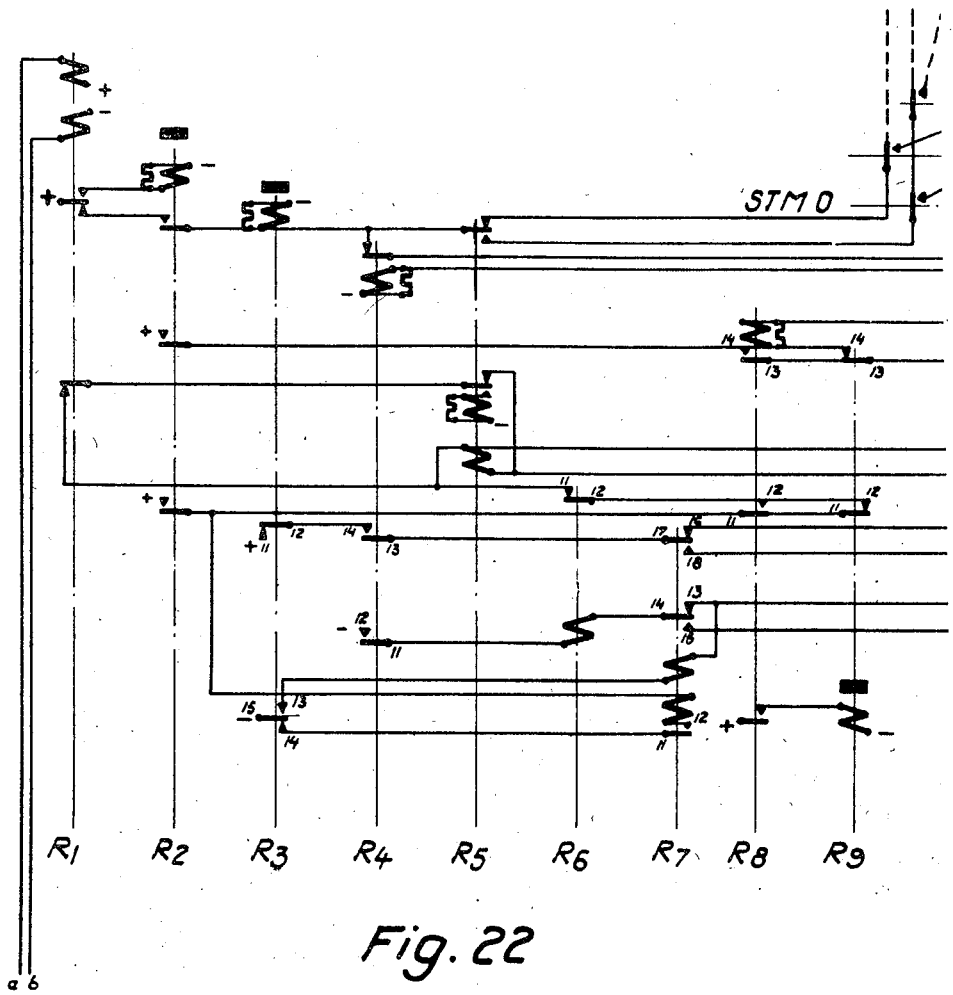
Figure 23:
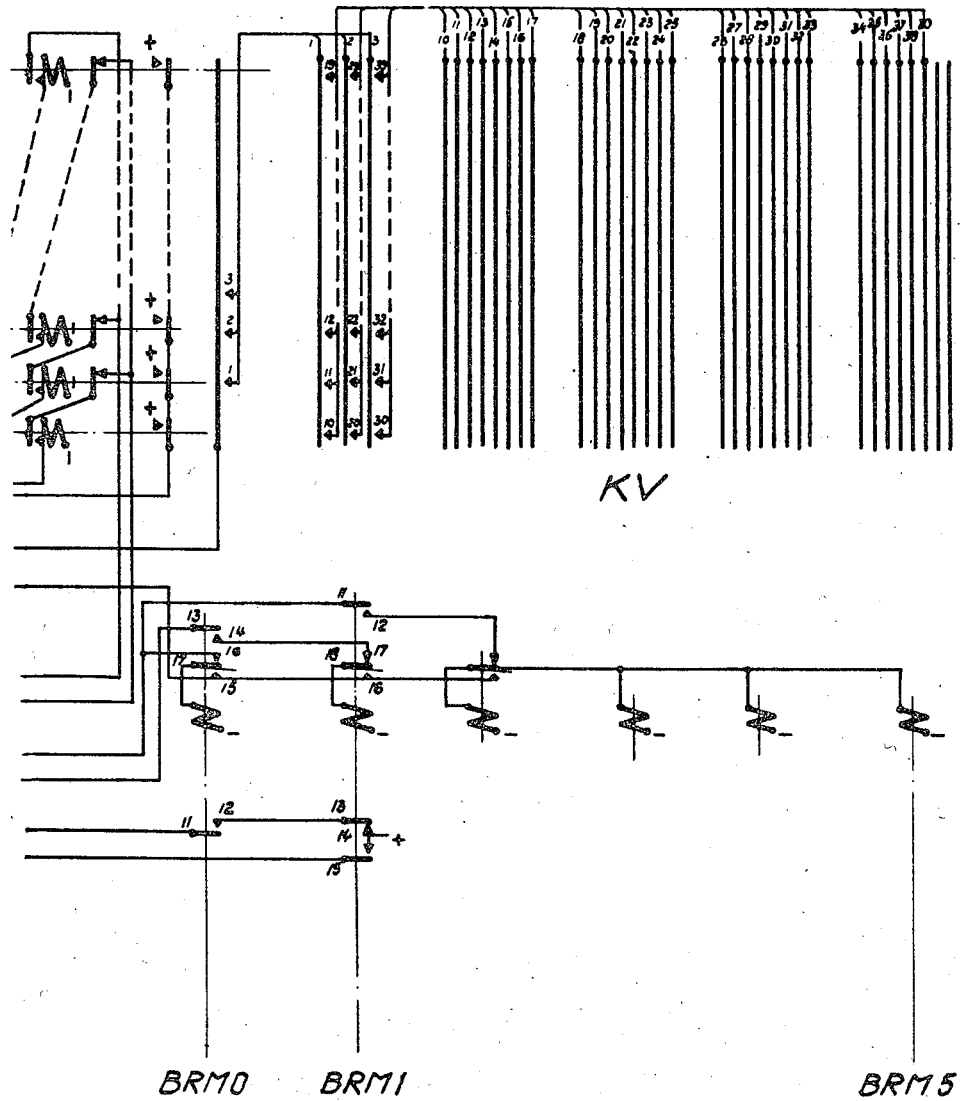

Figs. 22 and 23 finally show a register by which through a dial at the central installation connection can be made to desired box constructed according to Figs. 1, 8–13.

An alarm box according to Fig. 6 consists of a cover 1, door 2 and a panel 3. On Fig. 6, A shows the box seen from the front with the door removed, B the box from the front with the door closed and C finally a section x—x of the box. In a sunken part of the panel microtelephone 4 is hung up on a hook 5. Behind the panel necessary devices for signaling and telephone connections are arranged, such as relays, condensers, rectifiers etc. Also the lamp SK is placed behind the panel, but in such a way as to light up the number sign 6. The door handle 7 of the box is equipped with a seal 8. Access to the box can apart from actuating of said door handle also be gained with a key. For this reason a keyhole 9 is shown on the front of the door. Actuation of the door handle is assumed to take place in case of an emergency call, while for a service call access can be won by using the key. For this reason the key is constructed so as to pass through the door and operate a contact assembly 10 in the panel. When the said contact assembly is operated, the current circuits which evoke emergency calls are cut off. Necessary wirings are connected through the cable couplings 11—12.

*The arrangement in Fig. 7–13*

Alarm boxes containing telephone equipment and a relay for police flash signal and for change in the connection speech equipment in the box in case of line trouble to ground.

Line network connecting the alarm boxes with the central equipment. The network is double-wire and controlled by rest current. Only one alarm box is connected to each line.

Subscriber relays and test jacks, to which the lines from each alarm box are connected.

Finder device, consisting of a crossbar switch and relays, to identify the calling alarm box and connect it to a connecting link.

Connecting link, which through relays indicates emergency calls, service calls or line faults. The signals from the connecting link are forwarded to a control desk.

Control desk, consisting of speech equipment for communication with alarm boxes and equipment for dispatching calls from the alarm boxes to the city network or to direct lines.

Current supply set, containing devices for charging of the battery, and sources of energy necessary for the police flash system and for calls via ground in case of line trouble. The set also includes equipment for indication and automatic changeover to battery in case of a net breakdown, as well as fuses and meters.

Test equipment box, containing instrument for testing apparatuses, lines and the central installation.

Storage battery 48 volts, as an emergency source of energy.

Extra alarm and fault signals bells, possible to connect with the central when needed.

Lamp panel and orientation map, on which the numbers and positions of the alarm boxes are indicated by lamps. They light up when corresponding alarm box is used for a service or emergency call.

The finder device, including a selector, preferably of crossbar switch type, connects the calling alarm box to a disengaged connecting link and connects indication facilities through the multiple of the selector device. These facilities are controlled by connecting devices in the connecting link. Crossbar switch selectors have been used in this case, because of their swiftness of operation and service reliability.

For outgoing calls, a line from an alarm box is connected to a disengaged connecting link through an index device, which makes a simulated call.

Each line is normally controlled by rest current through the alarm boxes. This current is received through the line relays in the central installation. These sequence action relays lie attracted in the first step by the rest current.

Figure 7:
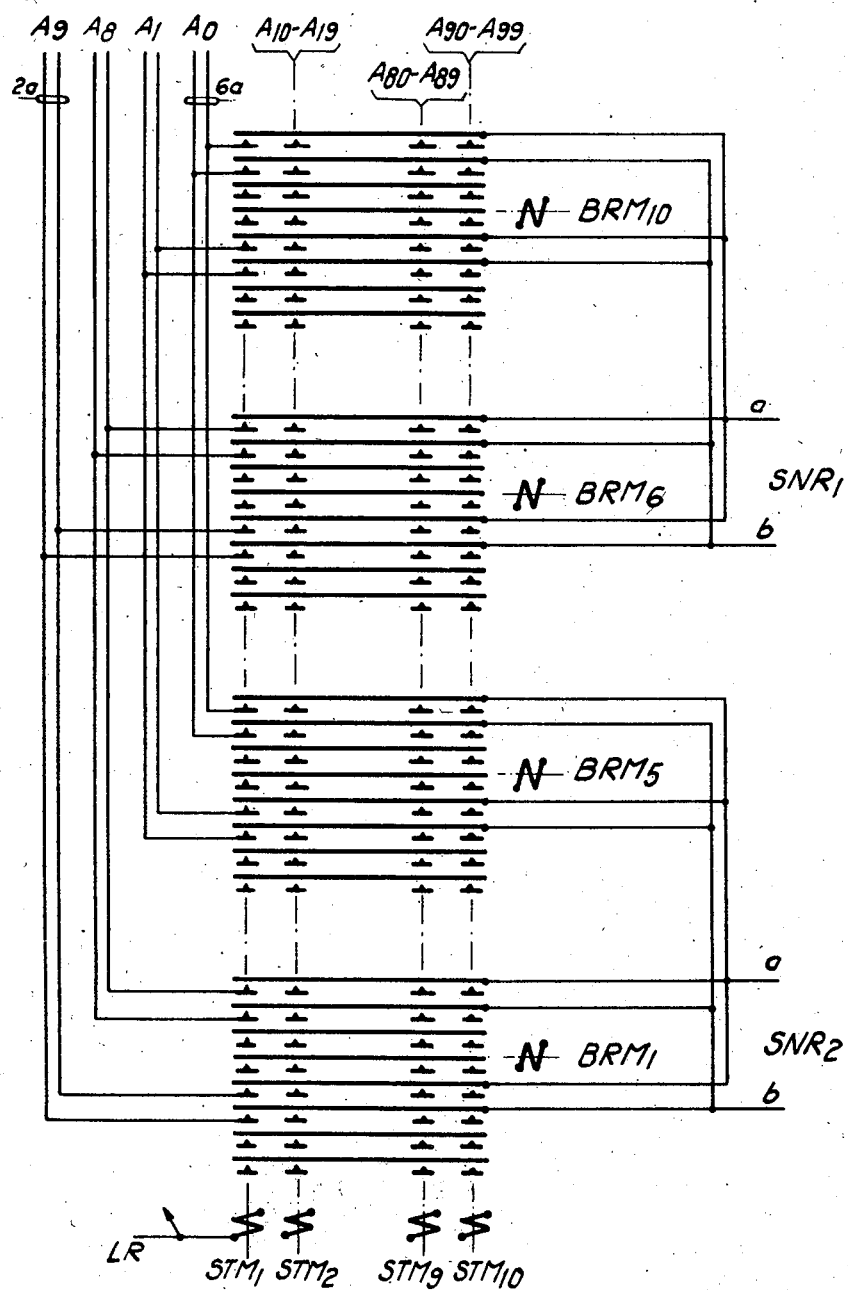

How the selector is disposed is evident from Fig. 7. To every crossbar switch of double-group type, 100 alarm boxes A0–A99 are connected. Thus each of the boxes A0, A2, A4, A6 and A8 are connected to a separate top group of the hold bars BRM6—BRM10, belonging to the select bar STM1, while the boxes A1, A3, A5, A7 and A9 in the same way are connected to the lower groups. The boxes are further multiplied also on the hold bars BRM1–BRM5. Thus the boxes A0 and A1 are connected also to the hold bar BRM5, etc.

The select magnets STM are connected in a relay chain, in such a way as to allow only one magnet at a time to make contact. Each select magnet is connected to closing contacts of 10 line relays (LR), belonging to the 10 alarm boxes, STM being connected to the line relays for the boxes A0–A9 etc.

The hold magnets are connected in such a way as to carry out a call finding motion and stop when the calling alarm box has been found. If both connecting links SNR1-2 are disengaged, the calls will alternate between SNR1 and SNR2. This is achieved through a call distributor, consisting of a relay. If one connecting link is busy, the other will naturally be used for any additional call, should a call be made from an alarm box when the two lines are busy, the lamp on the lamp panel corresponding to the box will be lighted up to show that another call is waiting. If so desired, also an aural signal can be provided for.

If, when the maximum number of alarm boxes are connected the traffic intensity is too high to be handled by these two connecting links, it is possible to add one more connecting link by connection of one additional selector with five hold magnets; or two connecting links, if one more selector with ten hold magnets is connected.

For every new hundred of alarm boxes, one selector device as outlined above should be connected, with its corresponding connecting links. Thus the installation can be arbitrarily expanded, without altering the constructing principle or making it more complicated.

*For service calls*

A person wanting to make a call opens the door of the alarm box with a key. This does not produce any signal at the station. When the microtelephone is lifted, the hook group is affected and closes its contacts, causing the line relay, a two step relay, to operate the second step and light up a panel lamp, which burns with fixed light. At the same time the selector is started. It identifies the calling box and connects it to a disengaged connecting link, establishing contact between the station and the alarm box. The call is answered by throwing over a speaking switch in receiving position. The telephone equipment at the station is of standard type.

If the calls is to be connected to a subscriber, the speaking switch is released and a switch in dial position is operated, which connects the speech equipment and the dial to a selector switch making it possible for the operator to choose a disengaged line. Call to the desired subscriber can be made either with the dial, if he is connected to an automatic telephone exchange or through a ringing signal by throwing the ring switch in its non-locking position, if the subscriber is connected to a local battery station or is a directly connected local battery station subscriber. When answer has been received, the speaking switch is operated to its other position in order to put the call through.

When the conversation is finished and the microtelephone in the box is replaced, the current in the line decreases and the disconnecting signal lamp is lighted up. Operated switches are restored to rest positions and finally the release switch is momentarily affected.

For emergency calls the door of the alarm box is opened by turning the door-handle. This breaks the sealing and one of the branches of the line is grounded. The identification takes place in the same way as in case of service calls. The indicator lamp is also lighted up as for service calls, but it now blinks. The emergency alarm bell receives current and sounds until the speaking switch is manipulated. Calls are put through in the same manner as service calls.

At the conclusion of an emergency call the disconnecting signal lamp is lit up, indicating that a release can be made.

Should an emergency call be made during a progressing service call, this is indicated in usual way at the next connecting link. Should all connecting links be busy with emergency calls, the subscriber lamp on the lamp panel is lit up, showing that an additional call is waiting. If so desired, an aural signal device can be added.

In case of leakage to ground on any line, the corresponding subscriber lamp on the panel lights up with fixed light. The fault signal lamp at the desk blinks. The call indicator lamp is burning dimly, showing that the selector stands in an outposition. If a service call comes in on the line, the indicator lamp lights up and burns with fixed light. The fault signal lamp continues to blink. Should an emergency call be made on the faulty line, the indicator lamp at the desk lights up with normal light and blinks. The fault signal lamp is extinguished. The subscriber lamp blinks.

In case of a break on any of the line branches, the corresponding subscriber lamp on the panel lights up and burns with fixed light, as does the fault signal lamp on the desk. The indicator lamp burns dimly showing that the selector stands in an out position.

If a service call is made, the indicator lamp lights up and burns with fixed light. Also the subscriber lamp burns with fixed light.

Should an emergency call be made on the faulty line the indicator lamp at the desk lights up with normal light and blinks. The fault signal lamp continues to burn with fixed light. The subscriber lamp blinks.

A short-circuit on any line is indicated in the same way as a break. It should be noted that release of the line after a call is to be done in the same way as when the line is functioning normally. If the fault remains, the fault indication will continue.

In this diagram description the following figures will be used: 8 alarm box, 10-11 finder device, 12-13 connecting link and central desk, 9 flash aggregate and line relays.

The line relays are two step relays and stay attracted in a center position when the normal rest current flows through the lines.

The relays RM4 and RM9 are polarized relays and how they work is described below.

Figure 8:
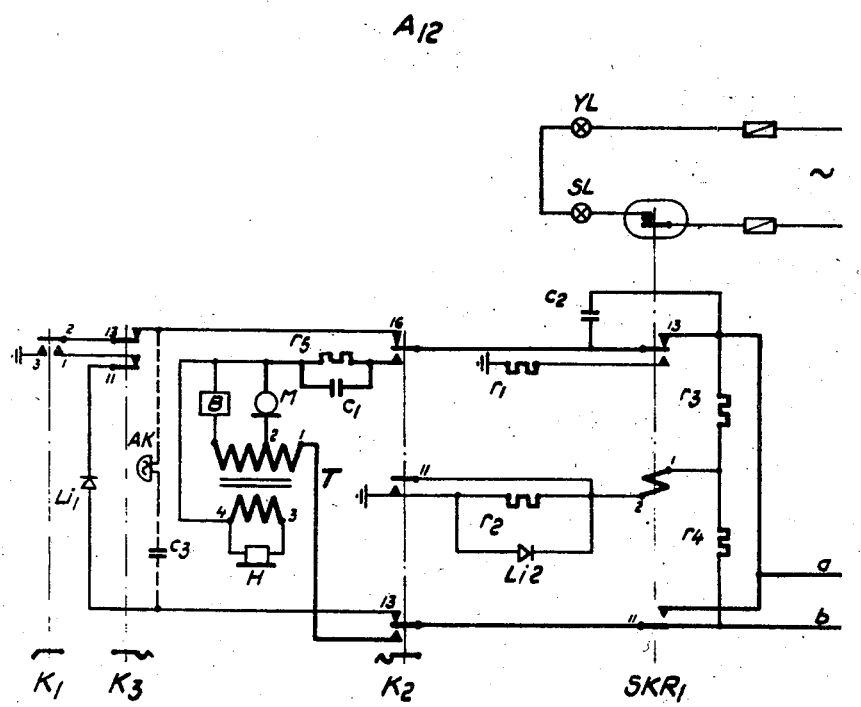

Assume that a service call is made from alarm box A12, which is shown in Fig. 8. In the case of a service call, the door of an alarm box is opened only since the bypassing connection K3 of the box has been affected by a key and the emergency contact K1 is then disconnected. No indication is received at the station. When the microtelephone is lifted, the hook K2 and its contacts are operated. Relay LR12 gets increased current through the speech equipment in the alarm box and the relay operates in full, that is to position b (positive LR12 4—3= BR12 15—16=I16—a-branch=SKR1 13—14=K2 17—18=R5 (C1)=T=K2 15—14=b-branch=II7=BR12 19—18=LR12 2—1=negative). When LR12 operates in full, the panel lamp for this subscriber gets current, lights up and burns with fixed light (Jord=BL1 1—2= III6=IV15=TL12=IV14=III53=II8=LR12 15—14= negative). The select magnet STM2 of the selector receives current from LR12 and operates (positive LR12 17—18=I6=III31=STM2 2—1=STM2 13—14=S1 16—15=S2 13—14=S12 24—23=r15=negative). In series with contacts on STM2 and through contacts of the remaining select magnets, the relay S2 is energized and operates (positive=LR12 17—18=I6=III31=STM2 2—1=STM2 13—12=STM 3—10 11—12=S1 19—18=S2 1—2=S12 22—21=negative). When S2 attracts relay S1 receives current and operates in turn (positive S2 11—12=S1 3—4 negative) cutting off the current to S2 and the delayed-action relay is released. S1 is held for the time being by its own contacts (positive LR12 17—18=I6=III31=STN2 2—1=STM2 13—12= STM 3—10 11—12=S1 19—17=S1 1—2=S12 22—21= negative).

When relay S2 releases, the hold magnets call finding motion begins, and BRM1 is operated. This finding motion has been delayed during the actual operation of relay S1 and the releasing time for relay S2. The delayed action has been employed, should calls be made simultaneously from alarm boxes connected to different select magnets. In such a case two or more of the select magnets can momentarily be affected at the same time, until finally the last magnet in the relay chain is held. The delaying action has been added to allow the select fingers of these momentarily affected selectors to return to their rest positions and not in-appropriately affect the multiple contacts. When BRM1 is operated, BRM2 gets current and operates (positive=r16=S1 13—14=S2 16—15=S12 25—26=S11 13—14=S10 13—14=S9 14—13=S8 22—21=BRM 5—2 16—15=BRM1 12—13=BRM2 1—2= negative). BRM1, which was temporarily held via the connecting link SNR1 (positive=ÅO 43—42=I30(3)= 14 III24=BRM5—2 19ö—19=BRM1 16—14=BRM11 —2=negative) is released when BRM operates. Hereafter BRM3 gets current and BRM2 is released etc. When BRM4 operates relay S10 is energized and operates (positive=S10 1—2=r17=S8 26—25=BRM5 12—11=BRM4 C=III53=II8=LR12 15—14=negative) at which the finding motion is stopped and the current circuit (positive R16=S1 13—14=S2 16—15=S12 25—26=S11 13—14=S10 13—14=S9 14—13=S8 22—21=BRM 5—2 16—15=BRM1 12—11=BRM1 1—2=negative) is broken. BRM4 is held through SNR1 (positive ÅO 43—42=I30 (3)=14=III24=BRM5 19ö—19=BRM4 19ö—18=BRM4 1—2=negative) relay S12 gets current from S10 and operates (positive S10 22—21=S12 1—2=negative), cutting off the current to and releasing S2 and STM2. When S2 is released, S1 becomes currentless and is also released. When relay S12 was operated, relay S6 got current and operated (positive=S12 13—14=S9 17—16=S11 18—17=S10 24—23=S6 1—2=negative), sending current through the cut-off relay BR12 which then operates the first step, affecting its a-contacts (positive=ÅO 43—42= I30 (3)=I4 III24=S6 13—12—11=BRM4D=III54= II9=r17=BR12 3—4=negative). As further relay S8 receives current from S6, it is also operated (positive AO 43—42=I30 (3)=I4=III24=S6 21—22= S8 1—2=negative). The relays S6 and S8 are held (positive ÅO 43—42=I30 (3)=I4 III24=S6 21—23 (S8 21—22)=S6 1—2 (S8 1—2)=negative). When S8 operates, it cuts off current to S10, which then releases.

When relay BR12 operates in a-position, the current for relay LR12 is cut off and it starts to release. In its a-position it receives current again, but reduced through the resistance r9, causing it to stop in a-position (positive=LR12 4—3=LR12 12—11=BR12 13—14=r9= negative). When relay LR12 in this way returns to the a-position, the call finding busy test contacts are disconnected. The subscriber lamp TL now receives current from SNR1 and burns with fixed light (positive=RM8 17—18=I3=II23=S8 14—13=III24=I5=K0 13—12= I23 (5)=III26=r18=S6 16—15—14 = BRM4 = C= III53=II8=IV14=TL=IV15=III6=BL1 2—1=Jord). In series with the lamp the resistance r18 is connected and reduces the current to the lamp so that it burns dimmer than during the identification. It is therefore possible to judge from the lamp panel if any subscriber is waiting, when all connection links are busy, because the waiting subscriber's lamp then gets current from its own relay LR and burns brighter.

Connection has now been established from the alarm box A12 through the finder device and the connecting link to the speech equipment at the central desk (positive E4=RM9 12—11=RM4 22—14=RM6 13—14=I1= II21=19ö—19=S6 26—25—24=BRM4 A—a=III51= I16=a-branch=SKR1 13—14=K2 17—18=r5 (C1)= T=K2 15—14=b-branch=II7=III52=BRM4 b—B=S6 18—19=S8 17—18 = III22=I2 = RM6 12—11 = RM2 22—21=RM4 12—24=RM9 13—14=negative E4). The current through the windings III of the polarized relays RM4 and RM9 is so balanced by the resistances r10 and r12 that only relay RM4 is operated by the current through the speech equipment T of the alarm box and the resistances r10, r14 and r12. When relay RM4 operates, relay RM10 is energized and attracts (positive ÅO 43—42=I30 = I4 = RM5 12—11 = RM9 32—31= RM4 32—33=RM10 3—4=RM2 13—14=RM6 26—27=negative).

When relay S8 operated and closed its contacts, the call lamp AL at the central desk received current through the resistance r16 in the connecting link, at which it lighted up dimly (positive RM8 17—18=I3=III23=S8 14—13=III25=I5=r8=II4=I25 (4)=AL=ground). When later on RM10 functions, AL gets genuine positive and burns brightly (positive RM8 17—18=RM10 13—14=II4=I25 (4)=AL=ground). At the same time the bell TLK is energized and rings (positive RM10 18—19=I5=I5 (8)=EO1 A 33—32=EO1 B 22—23=EO2 A 48—47=TLK=OK 12—13=ground).

The call is answered by throwing the speaking switch EO1 to position A. Via the contact of the switch connection is established with the alarm box. (Connecting link a-branch=III=I1 (1)=C12=EO1 A 45—46=FS=C14=T=C15=EO1 A 35—36=C13=I2 (2)=II2=connecting link b-branch.) (The speech equipment T and the dial FS are standard type and will therefore not be described.) When the switch EO1 is thrown over to speech position, the bell TLK is cut off.

In case the call is to be connected to another subscriber, the switch EO1 is released and instead the switch EO2 is thrown over to position A. This connects the speech equipment T and the dial FS to the selector VO, by which a desired disengaged line can be chosen. Call to the desired subscriber can either be made with the dial, should the subscriber be connected to an automatic telephone station, or by a ring signal made through a momentary throw-over of the switch EO2 to the non-locking position B, if the subscriber is connected to a local battery exchange, or is a directly connected subscriber at local battery exchange. As soon as connection is established with the called subscriber, the switch EO2 is returned to its rest position and the switch EO1 is thrown to position B, establishing connection between the alarm box and the called subscriber. It is possible to control the communication by throwing the switch EO2 to position A. A separate contact arm of the selector VO is connected to lamps and shows when a line is busy.

When the conversation is concluded and the microtelephone is replaced, the current in the line circuit decreases by connecting the resistances R3 and R4 in the alarm box instead of the speech equipment. The armature of RM4 returns to its center position, as it is equipped with center position adjustment. This breaks the contacts 32—33 of relay RM4, energizing relay RM11 which formerly was short-circuited by RM4, causing it to operate (positive AO 43—42=I30=I4=RM10 11—12= RM11 1—2=RM10 3—4=RM2 13—14=RM6 26—27= negative). The disconnection lamp SL lights up (positive=RM11 15—16=II2=I4=SL=ground), and after control that the conversation is ended the switch EO1 can be released. Disconnection is made by momentarily manipulating the nonlocking switch ÅO, cutting off the current to the two relays RM10, RM11 and to S6, S8 and BRM4 in the finder device as well as to the cut-off relay BR, which all are released. That the disconnection is complete can be controlled by the lamp AL, which burns until everything is released.

Should a new call be made after the just described call is concluded, the connection current circuit of the hold magnets will go via contacts 14—15 instead of earlier through the contacts 14—13 on the remanence relay S9, which is operated (positive=S11 12—11=S10 11—12= S5 11—12=S8 23—24=S9 1—2=negative). The call finding takes place by way of the hold magnets BRM6—BRM9. Because furthermore 18—19 are closed, and 16—17 open on S9, S3 will operate by through-connection in the finder device (positive=S12 13—14=S9 17—18= S10 18—19=S3 1—2=negative). Connection will therefore be established by way of the connecting link SNR2. Naturally the circumstances will be the same in case the last-mentioned call is made while the above described communication still is in progress. By through-connection of the call to SNR2 and operation of relay S5, the lower winding of relay S9 is energized (positive=S11 12—11= S10 11—12=S5 14—13=S8 12—11=S9 11—12=S9 4—3=negative), and operates, the next call being established by way of the connecting link SNR1.

If a call had been made from a box connected to one of the lower groups of the selector, relays S11 would have received current instead of S10. In such a case, relay S7 and S4, respectively, had received connection current instead of S6 and S3, respectively.

In case of an emergency call, the contact group K1 is affected when the door of an alarm box is opened, and the a-branch is grounded. LR12 then operates, receiving current from half the voltage of the battery, as the central point of the battery E1 is grounded (ground=half E1=LR12 4—3=BR12 15—16=II6=a-branch=SKR1 13—14=K2 17—16=K3 14—13=K1 2—3=ground).

Localization takes place in exactly the same way as described above for service calls, but relay RM5 will function, because the a-branch is grounded (ground=RM5 1—2=RM2 12—11=RM7 11—12=III8 (E4m)=half E4=II20=RM9 12—11=RM4 22—14=RM6 13—14= I1=III21=S8 19ö—19=S6 26—25—24=BRM4 A—a= III51=II6=a-branch=SKR1 13—14=K2 17—16=K3 14—13=K1 2—3=ground). Furthermore the relays RM4 and RM10 are operated. Relay RM5 establishes a current circuit to RM6, which operates (positive=ÅO 43—42=I30=I4=RM5 12—13=RM6 2—1=negative) and cuts the line branches a and b and also the current circuit for the windings III of the relays RM4 and RM9 as well as for RM10. RM4 and RM10 are released. When RM6 operated, also RM7 was energized and operated (positive=ÅO 43—42=I30=I4=RM6 22—21= RM7 1—2=negative). This again connects the line, now with reversed direction of the current. The windings III of the relays RM4 and RM9 are again connected by way of contacts on RM7. RM6 is held through the make contacts of RM7. When the line was cut out by RM6, RM5 was de-energized and released. While RM7 is actually operating, relay RM6 is kept by the discharge of the condensor C11. Relay RM7 further disconnects the winding of relay RM5 and thus ends the grounding of the central point of the source of energy supply E4.

On account of the reversed current course in the line circuit, the rectifier Li1 gets current. This increases the line current in such a degree as to operate the two relays RM4 and RM9. Relay RM9 connects relay RM8, which operates (positive=ÅO 43—42=I30=I4=RM5 12— 11=RM9 32—33=RM7 16—17=RM8 1—2=negative). Further, RM9 breaks the current circuits of RM10 and RM11, preventing their operation of RM4. As relay RM8 operates, RM10 is connected and operates (positive=ÅO 43—42=I30=I4=RM8 13—14=RM4 32—33=RM10 3—4=RM2 13—14=RM7 23—24=negative). The lamp AL is lighted up similarly as during service calls, but due to operation of the switch-off contact of RM8 the pulsation device Imp. IC is connected and the lamp flashes. Through RM8 the emergency bell KLK gets current and rings until a reply is made by throwing over the speaking switch.

An eventual start of a speech recording apparatus, for instance a tape recorder can be made from contact of RM8.

When the microtelephone thereafter is lifted in the alarm box, relay RM9 is released, but this is of no importance since RM8 is held by way of its own contacts and a hold winding. The call is put through in the same ways as service calls.

When the microtelephone in the box is replaced after the conversation is ended and the door is closed, RM4 returns to its rest position, causing RM11 to operate, lighting up the lamp SL as previously described.

In case an emergency call is to be made while a service call is in progress, that is, if the service call must be discontinued and the microtelephone of the box replaced, the door should be closed for a moment and thereafter opened by the door handle. In this way relay RM5 is operated, releasing an emergency signal as previously described, indicating that the operator immediately must break in on the connected line and answer the emergency call.

In case of leakage to ground, identification and connection to a disengaged connecting link is made in the same way as at an emergency call. Thus the relays RM5, RM6 and RM7 are operated, but since the rectifier Li1 is not connected, the relay RM9 does not operate and thereby not RM8. The fault lamp is lit up by RM6 (positive Imp. ID=RM8 23—24=RM6 29—28=I11=I3=FL= ground). The ground leakage causes a slightly increased ampèreturn on the windings I and II of the relay RM4. This is compensated in the winding III by short-circuiting of the resistance r9 by the make contact of RM7. Service calls from a box are in this case indicated because RM4 is operated when the microtelephone is lifted in the box, in turn operating RM10 and lighting up the lamp AL in full. After conclusion of the call, RM4 is restored to center position, at which RM11 operates and the connection can be released by momentary operation of the switch AO, but the relays RM5, RM6 and RM7 are again arranged in a connection link if the fault remains. When an emergency call is made, relay RM9 operates, the procedure being the same as previously described.

In case of a break in one of the two line branches, the speech equipment T in respective boxes is disconnected from the two branches and connected between the branches and ground by one in each box cased-in relay SKR1, which is operated by current between the branches and ground from a connecting link. The call connection is maintained via ground. Calls for service communications are made with a current strength determined by the speech equipment and resistance r1 in respective alarm boxes, while emergency calls via the rectifier Li1 in the box takes a higher current strength than service calls. The relays in the connecting links are connected so as to indicate these different current strengths. At a line break of this character the corresponding line relays LR are wholly disconnected, at which their a-position contacts are closed and selection of a disengaged connection link takes place is outlined above.

In the connecting link the windings I and II of RM4 receive no current. The winding III of relay RM4 operates the armature in reversed direction then before and closes a current circuit to relay RM2 (positive=AO 43—42=I30=I4=RM5 12—11=RM9 32—31=RM4 32—31=RM7 21—22=RM2 1—2=negative) which attracts and joins the wires a and b. At the same time the windings II of the relays RM4 and RM9 are cut out. The windings I of the relays RM4 and RM9 remain connected to the branches, and furthermore the current strength in their windings III is changed by connection of the resistances r11 and r13. Relay RM3 is operated by RM2 (positive=RM2 25—24=RM3 1—2= negative). At this, the negative side of the current source is connected to ground (ground=RM2 27—26=RM3 26—25=negative E4). Relay RM3 also connects the b-side of the speech equipment to ground and lights up the fault lamp.

When a service call is made, the contacts K2 in the box are closed at the lifting of the microtelephone. The resistance r2, being of relatively high ohmic value, (30,000 ohms) is by-passed, increasing the current through relay SKR1. It operates and connects the speech equipment T between the branches and ground. This in its turn increases the current through the windings of the relays RM4 and RM9. The current strength in the winding III of relay RM4 is so balanced as to operate this relay, which closes its contacts and works in exactly the same way as previously described. When an emergency call is made, K1 in the alarm box is closed. This grounds both branches (the rectifier Li1 in the box does not bar) and even in case of a break in one of the branches, a considerable increase in the current takes place in the windings I of the relay RM4 and RM9, operating also the relay RM9, which closes its contacts 32—33. Relay RM5 is prevented from operating because of this grounding of the box, its current circuit being broken by RM2. Relay RM8 is operated (positive=AO 43—42=I30=I4=RM5 12—11=RM9 32—33=RM7 16—15=RM3 23—22=RM8 1—2=negative) and an emergency signal is received in the same manner as previously described.

If a short-circuit is at hand between the branches, a call is made and a connection to a disengaged connecting link is achieved in the same way as for an ordinary call. But the current strength in the windings of the relays RM4 and RM9 is higher than for ordinary calls. This causes relay RM9 to operate and close its contacts. Relay RM2 operates (positive=AO 43—42=I30=I4= RM5 12—11 = RM9 32—33 = RM7 16—15 = RM2 29—29O=RM2 1—2=negative) and the functions are then exactly the same as during a line break, both for service calls and emergency calls.

If connections are released in case of line faults— break on one of the branches or short-circuit between the branches—the line is again connected to a disengaged connecting link.

During calls over lines with leakage to ground, interference from ground is often experienced, mainly as noise. This interference can be eliminated by operation of the common switch S0, which connects a condenser in parallel with the speech equipment, and of the condenser C2 in the boxes, since the relay SKR1 connects C2 in parallel with the speech equipment T.

Thus, a line with a line fault is barring a connecting link. This can be avoided by using special fault relay sets to which a faulty line can be connected through intermediate distribution cords, connected between the test jacks and the fault relay sets.

With instruments in a test equipment box (see separate description), measurements can be made to determine the nature of the line faults.

In case of simultaneous short-circuit between the two line branches and ground fault, it is impossible to maintain the connection with the alarm box. Such a line can, however, be disconnected by putting in a special plug in the test jack. The plug contains a resistance, balancing the strength of the rest current in such a way as to keep the corresponding LR-relay operated in a-position.

If several lamps are burning on the panel, that is, if several calls are in progress, it may be necessary to control which panel lamp corresponds to a certain call put through in a certain connecting link. The connecting links are therefore equipped with a control switch K0, which when operated connects a pulsating current Imp. IE to the corresponding lamp (ground=BL1 1—2= III6=IV15=TL12=IV14=III53=BRM c—C=S6 14— 15—16=r18=III26=I23=KO 12—11=Imp. IE=negative.

Transmission of fault signals and fire alarm signals according to Fig. 14 is achieved by having a release of the fault relay in the fire alarm central result in a current to relay FR in the alarm box. This relay operates and connects an impedance—suitably the speech equipment T— between the branches. The relay FR must be equipped with two cut-off contacts, connected in parallel with the cut-off contacts of the hook keys of the alarm box K2. In case of a fire alarm from the automatic alarm, the relay AR in the box operates and then grounds the a-branch. A fault signal from the automatic fire alarm thus is indicated as a service call at the central installation and a fire alarm in form of an emergency call. The alarm box can consequently be used both for signals directly from the automatic fire alarm and as a telephone box.

In order to receive police flash signals the two-step type relays BR are equipped with an extra winding. A desired number of such windings are connected to a blink-switch BO, installed at the desk. When the switch BO is affected, the relays BR connected to it get strong current and operate to their b-positions. At this the alarm boxes receive an increased negative tension —E3 (ca. 75 volts). Because of the used direction of the current, the rectifier $Li2$ by-passes the resistance $r2$, causing the relays SKR1 in respective box to work in time with the pulsation current from relay IR4. The relays SKR1 are equipped with a mercury contact, connected to the net in series with the box lamp SL and the outer lamp YL, thus causing the lamps to flash in time with the impulses. Relay LR gets current during this pulsation via a resistance $r9$ and the contacts (13—14) BR, and it will remain in the a-position during the time a police flash signal is transmitted.

When answer is received from any of the called boxes, the low ohmic relay BL1 operates. This relay is connected to all the panel lamps to which in turn a common BO switch is connected. When relay BL during a call gets current and operates, also relay BL2 operates and is held over ÅO and breaks its contacts (13—14), concluding the police flash signal. The switch BO must then be released.

When the traffic intensity is too high to be handled by only one operator (one telephone apparatus), a dividing up is of course possible and some connecting links can thus be served from one point and the others from another point. This can be achieved by using mircotelephone jacks, keys or relays.

A ring to voluntary firemen is put through in the same way as police flash signals are transmitted, but instead of sending negative through the contacts 17 and 19 of the relays BR, a ring signal is sent. If the voluntary firemen are alarmed only by bells, the transmission can be made in code, different code signals giving needed information. When an answer is made, (call) the signal transmission is broken off by a relay corresponding to relay BL1.

Figure 9:
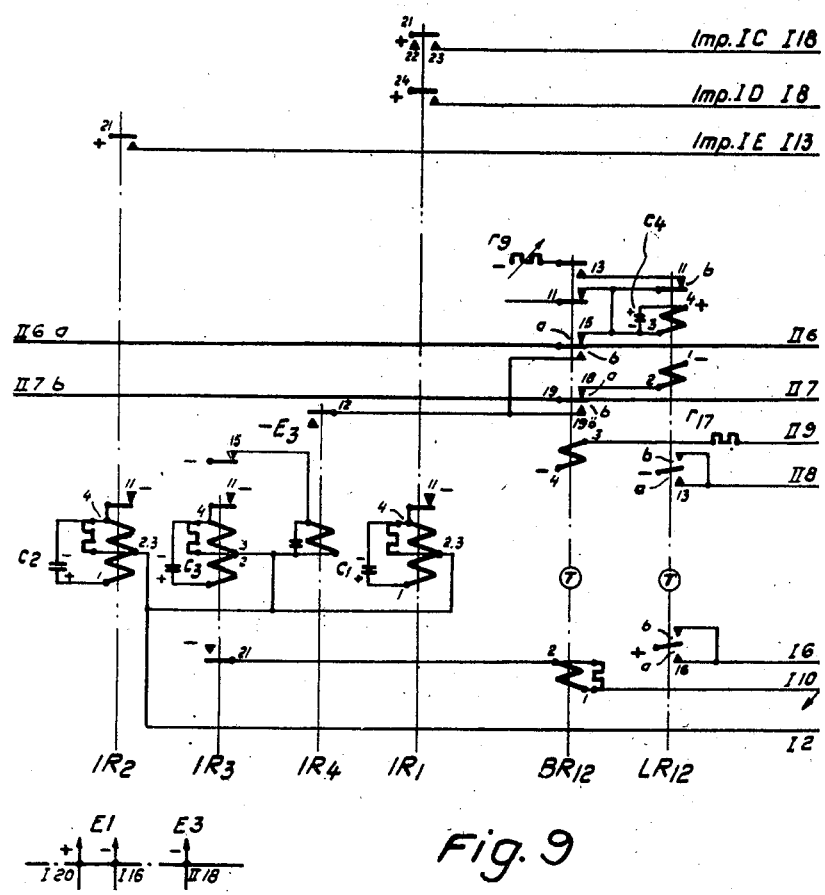

The blink set of system I, Fig. 9 consists of four impulse relays, IR1, IR2, IR3 and IR4, which are released with delayed action through electrolyte condensers. They have the condensers connected over the whole winding. Operation of the relay takes place only over a part of the winding of the relays IR1, IR2 and IR3. In this way the relays are delayed both in case of operation and release.

System I has three different kinds of blink impulses, namely "Imp. IC," and "Imp. ID" from relay IR1, "Imp. IE" from relay IR2 and "police flash" from the relays IR3 and IR4. "Imp. IC and ID" have the same pulsation times and are connected to the lamps of the desk and the panels in case of an emergency call. These impulses have a relatively quick pace. "Imp. IE" is the so-called control blink and is connected by operation of the control switch at the central desk. "Imp. IE" is somewhat slower than "Imp. IC" and "ID."

The impulses for the police flash emanate from the source of energy E3 and are received through the relay IR4, which operates at about the same time as IR3, but remains operated a shorter time than IR3. Relay IR3 operates the BR-relays, which connects the said impulses from E3 to the lines and thereby to the box relays. The impulses from E3 are broken by IR4 during the pulsation before the impulses from IR3, to allow the relays SKR1 in the boxes to release earlier than the BR-relays. The relays SKR1 otherwise would put through a call at each impulse, because they join the line branches.

The current supply according to Fig. 20 is based on so-called parallel operation, that is, the current is taken from the net and a battery E1 is used as a reserve source of current. The center point of the battery is connected to ground and its total tension is 48 volts. For system I an additional, not grounded source of tension E4 is required for each connecting link and one negative tension E3 to ground. These additional tensions E3 and E4 consist of rectified net tension, or, in case of a net breakdown, of alternating tension from the battery via a converter.

As is evident from the principle Fig. 20 the primary winding of the transformer $Tr1$ is connected to the alternating current net via the switch Omk. I, the fuses $Sr1$ and $Sr2$. From the secondary winding of $Tr1$, an alternating tension is taken and rectified by the rectifying bridge $Li1$. The direct tension from this bar, whose positive side goes via the fuse $Sr11$, the choke $Dr1$, the resistances $r1$, $r6$, $r5$, $r4$, $r3$ and the fuse $Sr14$, is the source of tension for all common relays and lamps at the central installation. Each connecting link and finder and each group of 10 LB-BR-relays have each a fuse $Sr14a$, $Sr15a$, etc. Between negative and positive a storage battery has been added. It is constantly charged when net tension is on hand. In case of a net breakdown this battery serves as an emergency source of tension.

The charging of the battery can be made in two different ways, as basic charging or maintenance charging. When switch Omk. II is put in the position for basic charging, the charging current is determined by the variable resistance $r1$ and the current can be measured with the instrument over the resistance $r6$. When the battery is charged and only needs to be maintained, Omk. II is put in the position for maintenance charging and the charging current passes through the variable resistance $r2$. The current is measured over the resistance $r5$.

The current which is received from the battery can be measured by way of the resistances $r3$ and $r4$. The center position of the battery is grounded, as before mentioned.

On the secondary side of the transformer $Tr1$ a relay RL21 is connected, and lies attracted in series with the half wave rectifier $Li5$. Across the coil of the relay the condenser C1 is connected, balancing the tension for the relay. When a net breakdown takes place, the relay RL21 releases, lighting up the net breakdown lamp NL.

From the secondary winding of the transformer $Tr3$ and alternating tension is led via the fuses $Sr6$ and $Sr7$ to a rectifier $Li3$. This tension is rectified and filtered by the choke $Dr3$ and the condenser C3. Negative is then taken out via fuse $Sr17$, and positive via the negative side of the battery. This tension constitutes the source of current E3, which is used for police flash signal.

The transformer $Tr4$ has two secondary windings from which the alternating tension passes via the fuses $Sr4$ and $Sr5$ to the rectifier $Li41$ and $Li42$. The tensions are rectified and filtered by the chokes $Dr41$ and $Dr42$ and of the condensers C41 and C42. Positive from $Li41$ is then connected via fuse $Sr18$ and negative from $Li42$ via $Sr19$. Positive of $Li42$ and negative of $Li41$ are joined to a central point. The load resistances $r11$—$r13$ are connected by way of the sources of current E3 and E4 and serve as tension stabilizers.

The transformer $Tr5$ has two secondary windings of which one supplies ring current E5 via the fuses $Sr20$ and $Sr21$. The other winding sends current through an eventually connected speech recording apparatus M, for instance a tape recorder, which is connected when the relay RL22 operates. This relay operates when an emergency call reaches the central installation.

The alarm contacts of the fuse holders are all connected to a common lamp SAL, which lights up when a fuse blows.

In case of a net breakdown there must of course be a substitute also for the sources of current E, E4 and E5. When relay RL21 releases due to a net breakdown, the relay connects a converter to the storage battery and the converter starts. The alternating current side of the converter is via the interchange of RL21 and the fuse S$r$5 connected to the primary sides of the transformers T$r$2—5 and maintains in such a way the alternating current to these. The battery thus serves also in this case as a reserve source of tension at a net breakdown.

To match the converter to the transformers, a variable resistance $r$14, a condenser C5 and a resistance $r$15 have been added. To make it possible to test the converting devices at certain intervals a switch Omk. I has also been added, by which the net tension can be cut off. The converter then starts as before described and all tensions and currents can be controlled by the instrument.

To test alarm boxes, lines and central equipment in a simple manner, a special test box has been constructed, Fig. 21. This is designed as a control desk and is supplied with a testplug, attached to a long cord. All outgoing lines are equipped with test jacks PJ and the testplug can consequently be connected to anyone of them. At this the corresponding line passes the test box and its instruments I$a$ ($a$-branch) and I$b$ ($b$-branch). The instruments used have mid-positioned indicators, thus allowing the current to be determined irrespective of the current direction. The normal test current for each line can consequently be checked simply by moving the testplug from testjack to testjack.

To test the central equipment for service calls, the switch O2 is put in position 2. At this the two resistances R$a$ and R$b$ are connected in series between the $a$- and $b$-branches. The resistances, which are variable, must then be put to their maximum positions. By decreasing the resistance, the current increases in the windings of those line relays belonging to the central equipment which are connected to the tested line. This current also flows through the instruments I$a$ and I$b$ and it is thus possible to read the current at which service calls are indicated at the central installation. If the value of the resistances R$a$ and R$b$ is further decreased, it is of course possible to determine the value of the current at which a short-circuit is indicated.

In order to test emergency calls and leakage to ground a switch O3 is operated to position 1. At this one side of the resistance R$a$ is grounded and the instrument I$a$ of the $a$-branch gives the current strength at which emergency calls and leakage to ground is indicated. The same procedure can be followed for the $b$-branch by operating the switch O3 to position 2, using resistance R$b$ and reading the current on instrument I$b$.

To test indication of breaks, the resistances R$a$ and R$b$ are first set to a pre-determined low value and the switch O2 is operated to position 1. This connects the resistances in series with respective branches. If the value of one or both of the resistances is increased, the line resistance of the branches is similarly increased and the instrument reading gives the current value at which a break is indicated at the central installation.

In order to test the line and the alarm box, switch O1 is operated. The branches from the central installation are cut off and instead a resistance R$h$ is connected between them. This resistance is chosen so as to allow the normal rest current to pass and therefore keep the line relay of the central installations in normal position while the line and the box are tested. When the switch O1 was operated, a special source of tension B was also connected to the line branches via the instruments.

Leakage to ground can be measured by way of switch O4. When this switch is put in position 1, the negative side of the source of tension B is grounded, while the positive side is connected to the $b$-branch via instrument I$b$. If there is a leakage to ground from the $b$-branch, this will be evident from the reading of the instrument. The result will be the same as regards the $a$-branch if switch O4 is operated to position 2, connecting the positive side of the source of tension B to ground and the negative side to the $a$-branch via instrument I$a$. To allow a leakage test also with reversed current direction in the two branches, the switch O6 has been added. This switch reverses the current direction to the line branches and the test must then be made once more with O4 operated.

It is also possible to measure the operation current of relay SKR1 in the box. This is done in the following manner:

The switch O1 remains operated. The resistance R$a$ is put to its maximum value. The switch O2 is put to position 1 and switch O5 is then operated. The positive side of the source of tension B is grounded and the $a$-branch gets an increased negative tension via the instrument I$a$ and the resistance R$a$. The current passes the resistance $r$3 in the box, relay SKR1 and the rectifier L$i$2 to ground. If the resistance R$a$ in the test box is decreased, the current through the winding of the relay SKR1 naturally increases. When the relay operates, the resistance $r$3 in the box is connected in parallel with the resistance $r$4. This leads to a sudden change in the current, readable on the instrument I$a$ of the test box. The operation current value of the relay SKR1 is equal to the observed value before the sudden change in the current.

To allow conversations between the box and the test box, the speech equipment T has been added. This is connected by operating switch O7 to position 2. If the box is equipped with a bell, ring signals can be transmitted to it by operating switch O7 to position 1.

*The arrangement in Figs. 15—18*

Alarm boxes containing telephone equipment, two relays for identification of calling alarm box, one relay for police flash signal and one for change of the connection of the speech equipment in the alarm box in case of line trouble.

Line network connecting the alarm boxes with the central equipment. The network is double-wired and controlled by rest current. Up to ten alarm boxes can be connected to each line.

Control desk, furnished with speech equipment for communication with alarm boxes and facilities for dispatching calls from the alarm boxes to the city network or extension to direct line.

(a) One individual relay set for each line, to which the line from an alarm box is connected.

(b) One common relay set with indication devices, which through the relays indicates emergency calls and from what box such a call has been made; service calls and line faults.

Current supply set, Fig. 20, containing facilities for charging the battery, sources of energy necessary for the police flash system and for calls via ground in case of line trouble. The set also includes equipment for indication and automatic change-over to battery in case of a net breakdown, as well as fuses and meters.

Test equipment box, Fig. 21, with instruments for testing apparatuses, lines and the central installation.

Storage battery, 48 volts, as an emergency source of energy.

Extra alarm and fault signal bells, possible to connect with the central when needed.

Lamp panels and orientation map on which the numbers and positions of the alarm boxes are indicated by lamps. They light up when the corresponding alarm box is used for a service or emergency call.

The for each line individual relay sets contain relays which indicate calls and different line faults, and switches for connection of the line to the common relay set, when said indication is received. The individual relay sets further contain a selector switch by which calls to another subscriber can be connected, and facilities for police flash signal.

Also the common relay set includes relays, indicating calls and different line faults, and besides a device for indicating a certain calling alarm box of a line. It further includes speech equipment, dial and ring signal transmitter to be used in connecting another subscriber.

When indication is received via the individual relay set, the line in question is connected to the common relay set by a throw-over switch and the call is answered. If the call is to be connected to another subscriber, the selector switch belonging to the line is moved to connect a disengaged line, corresponding to the desired subscriber. Thereafter the connection is completed by the speech equipment, dial or the ring signal transmitter, depending on whether the subscriber is connected to a central battery exchange or a local battery exchange.

In case of an emergency call, the subscriber is automatically identified and one to his number corresponding lamp is lit before he is connected to the speech equipment.

After service calls, a clearance signal is received from a special lamp when the calling subscriber replaces the microtelephone. Emergency calls are indicated by blinking light from the call lamp. That the door of the alarm box is closed after the microtelephone has been replaced can be controlled by the fact that the identification lamp corresponding to the box then is extinguished.

A special lamp indication is received in case of leakage between the branches and ground. The fault switch included in the individual relay set should then be thrown over to the proper position. The calls are thereafter put through as described above, but with the difference that also emergency calls are indicated as service calls.

In case of a short-circuit between the branches or a break on one of them, a special lamp indication is also received, whereupon the fault switch of the individual relay set is thrown over to the other position. This connects the energy supply of the individual relay set beween the two joined branches and ground, and the communication can be maintained by way of the branches and ground. Indication and dispatching of a call takes place in the same way as in case of line faults.

In the description the following figures will be used: 15 alarm box, 16 individual relay set, 17—18 common relay set and central desk.

The relays RL1, RL5, RL8 and RL13 are polarized relays.

Normally, the line is controlled by rest current (positive E2=AR1 winding I=AR3 14—15=BR 11—12=a-branch=final equipment AR=b-branch=BR 15—14= EO4 33—32=AR3 18—17=AR1 winding II=negative E2). Relay AR1 is in rest position because of current through the winding III counteracting windings I and II (positive=AR1 winding III=EO4 42—43=r6=negative).

Assume that a service call is made from alarm box A9, as shown in Fig. 5. For service calls, the door of the alarm box is opened by a key. The emergency contacts K1 is then not actuated. Consequently, no indication is received at the station. When the microtelephone is lifted the hook K2 is affected, operating its contacts. Relay AR1 then gets increased current via the speech equipment T in the alarm box (Positive E2=AR1 winding I=AR3 14—15=BR 11—12=a-branch=SKR4 15— 16=r1=r2=SKR3 15—16=K2 11—12=T=K2 14— 13=b-branch=BR 15—14=EO4 33—32=AR3 18— 17=AR1 winding II=negative E2). This increases the current through the windings I and II of AR1, resulting in higher ampereturn than the current through winding III, causing the relay to operate and its contact 12 to light the lamp AL1 and contact 14 to send current to the common signal bell KL1.

The call is answered by throwing over the speaking switch EO1 of the individual relay set, to position A. Through the contacts of the switch, communication with the alarm box is established (T (at the desk)=C11= FS=C9=RL2 16—15=AR3 16—15=BR 11—12=a-branch SKR4 15—16=C1=SKR3 15—16=K2 11— 12=T (in the box)=K2 14—13=b-branch=BR 15— 14=EO4 33—32=AR3 18—19=RL14 21—22=RL2 14—13=C10=C12=T (at the desk)).

The speech equipment T and the dial FS are of standard type and will therefore not be specially described.

By the switch EO1 the windings I and II of the relay AR1 are disconnected, and instead corresponding windings of the relays RL5 and RL8 of the common relay set are connected (Positive E1=RL5 winding I=RL8 winding I=RL11 25—26=RL14 18—19=AR3 16— 15=BR 11—12=a-branch=SKR4 15—16=r1=r2= SKR3 15—16=K2 11—12=T=K2 14—13=b-branch= BR 15—14=EO4 33—32=AR3 18—19=RL14 16— 15=RL11 29—28=RL8 winding II=RL5 winding II= negative E1). RL8 operates and then RL7 (Positive= EO3 12—13=RL8 32—33=RL7=RL9 16—15=RL10 14—13=RL14 28—29=negative) cutting out the bell KL1 and lighting the lamp AL. If the calls is to be connected to another subscriber, the switch EO2 is thrown over to position A, whereupon the selector switch of the individual relay set is turned to connect an outgoing line over which the called subscriber can be reached (T (at the desk)=C11=FS=EO2 11—12=AR3 24—23= selector switch=outgoing a-branch=telephone apparatus of other subscriber=b-branch=selector switch=AR3 26—27=EO2 16—15=C12=T (at the desk)). Connection to the desired subscriber can be made directly by the speech equipment T, if he is a central battery exchange subscriber; and by momentary operation of EO2 to position B to transmit a ring signal if the subscriber is connected to a local battery exchange. When connection is established with the called subscriber, EO2 is restored to rest position and EO1 of the individual relay set is put in position B, establishing the communication by way of the individual relay set (T (in the box)=K2 14—13=b-branch=BR 15—14=EO4 33—32=EO1 11—12=C6= selector switch=outgoing b-branch=speech equipment of other subscriber=a-branch=selector switch=C5=EO1 16—15=BR 11—12=a-branch=SKR4 15—16=C1= SKR3 15—16=K2 11—12=T (in the box)). The communication is connected at the central battery and automatic exchanges by the coil D2 of the individual relay set. If the connection between the speech equipment and another station is to be disconnected during a certain period of the connection or communication time through an operation of EO2, the coil D3 is connected in order to hold the communication.

When the microtelephone was lifted in the box, the current through the windings I and II of the relay AR1 was strengthened, increasing the ampereturns of these windings to be the strongest and thus operating the relay. When the connection of the line is shifted to the common relay set, the winding III is in turn operating the relay. When EO1 is thrown to position B the windings I and II are again the strongest. The lamp AL1 thus continues to remain lighted during the entire connection and communication time.

At the disconnection of the common relay set, when EO1 was shifted to position B, the armature of the relay RL8 returned to its center position, at which RL6 operated (positive=EO3 12—13=RL7 17—18=RL6= RL7=RL9 16—15=RL10 14—13=RL14 28—29=negative), and lighted the lamp SL. The relays RL6 and RL7 are released through momentary operation of EO3 to position A, extinguishing the lamps AL and SL. The common relay set is now disengaged.

When the call is concluded and the microtelephone in the alarm box is replaced, the current in the circuit decreases to rest current value by disconnection of the speech equipment. Only the coil D1 remains connected to the line. The resulting ampereturn in the windings of the relay AR1 is then on the whole zero, at which the relay releases and the lamp AL1 burns with decreased intensity (positive E1=AR1 12—11=EO1 22—21=r4=AL1=center position of source of energy), indicating clearance signal. The contacts 15—16 of the relay AR1 breaks off the holding current circuit to a connected automatic or central battery exchange.

The call is now concluded. The key EO1 is thrown over to position A, the operator checks that the conversation is ended and restores first the selector switch and then EO1. If connection was established with a local battery exchange subscriber, also EO2 in position B must be momentarily operated at the same time as said control is carried out.

When an emergency call is to be made and the door of an alarm box is opened, the contact group K1 is affected and the $b$-branch momentarily grounded by the contacts 11—12. Relay AR2 is then operated by current from half of the source of energy E2, as the center point of the said source is grounded through the winding I of AR2 (center position of source of energy=EO4 22—23—44—45=AR2 winding I=AR2 19ö—19=ground=SKR3 21—22=K1 12—11=$b$-branch=BR 15—14=EO4 33—32=AR3 18—17=AR1 winding II=negative E2). At this the lamp AL2 is lit and the $b$-branch is grounded by way of contact 12 of AR2, which further receives holding current through its own contacts 16—15 and AR3 12—11.

The call is answered by moving the switch EO1 to position A. Because the $b$-branch is grounded, relay RL1 operates (center position of source of energy=RL14 11—12=RL11 12—11=RL3 14—13=RL1=EO3 15—14=ground=AR2 11—12=BR 15—14=EO4 33—32=AR3 18—19=RL14 16—15=RL11 29—28=RL8 winding II=RL5 winding II=negative E1). RL operated in turn (positive=RL1 32—31=RL11 16—15—19ö—19=RL9=negative), and cuts off the holding current to winding II of the relay AR2 by contacts 13—14 RL9, because the holding of AR2 was taken over by the common relay set when EO1 was put in position A. As AR2 releases, the grounding of the $b$-branch is discontinued and RL1 is released. When RL9 operates, an operation circuit course for RL11 was prepared. However, the winding of RL11 was short-circuited by positive from 31—32 RL1 as long as this remained attracted. RL11 operates (positive=RL9 12—11=RL11=RL10 15—16=EL11 19ö—19=RL9=negative) and is held by its own contacts 19ö—18 and breaks the current circuit for RL9 which releases. When RL11 operated, the poles of the line branches are reversed and the ground connection to the center point of the battery is cut off by the contacts 11—12 RL11. RL12 operates and grounds the positive side of the battery E1 through the resistance $r5$ and relay RL1 (positive=$r5$=RL12 25—26=RL3 14—13=RL1=EO3 15—14=ground). RL1 operates again, getting current via the rectifier L$i$2 and relay SKR2, which rectifier and relay are connected in parallel between the $a$-branch and ground in all boxes ($a$-branch=SKR2=SKR2 17—17=SKR3 11—12=L$i$2=ground). The selector V operates (positive=RL1 32—31=RL11 16—17=RL3 15—16=V=negative) and carries current to RL4, which operates and short-circuits the winding of RL1, connecting the positive side of the battery directly to ground. The relays RL2 and RL3 operate. During the now started pulsation, relay RL2 remains attracted and breaks the connection to the speech equipment T and the current circuit to the identification lamps L1—L10 and short-circuits the windings I and II of the relays RL5 and RL8. Relay RL3 breaks the current circuits for RL1 and the selector V, which accordingly release. During the time relay RL4 remains operated, the tension E1 is carried between the $a$-branch and ground, causing relay SKR2 in the box nearest the station to operate (positive=RL4 11—12=EO3 15—14=ground=L$i$2 (in the box)=SKR3 12—11=SKR2 18—17=SKR2=$a$-branch=BR 12—11=AR3 15—16=RL14 19—18=RL11 26—27—28=RL2 12—11=negative). During the time relay RL4 is released and RL3 attracted, no ground connected tension is carried through the branches. SKR3 in the box whose SKR2-relay is attracted, then operates. The operation current circuit for SKR3 is prepared by the contacts 17—19 SKR2, but owing to short-circuit the relay is prevented from operating by the contacts 11—12 RL4 as long as this is operated.

When relay RL4 operates and the tension is connected between the $a$-branch and ground, current flows simultaneously through all not operated SKR2-relays. Due to the break off contacts 11—12, 13—14 SKR2, however, only the relay nearest to the station remains operated. The said breaks are by-passed when relay SKR3 is operated by its contacts 17—18 and 19—19ö. Each impulse thus consists of two parts. During the first part, the $b$-branch is connected to ground, allowing only SKR2 to operate; durinng the second part, the connection to ground is broken and SKR3 can operate and connect the subsequent boxes, which were disconnected by SKR2.

When RL3 releases after the conclusion of the first impulse the second impulse is started by connection and operation of RL1, at which V, RL4 and RL3 operate and then release as described above. The second impulse operates the relays SKR2 and SKR3 in box 2, the third impulse the relays in box 3 etc.

The pulsation continues all the way to the calling box, where the pulsation stops, because SKR3 remains disconnected by short-circuit of the contacts 13—14 K1. By this the line to subsequent boxes is cut off, preventing operation of RL1, releasing RL2 and lighting the identification lamp corresponding to the box. The windings of the relays RL8 are connected and so is the speech equipment. Ground via the rectifiers L$i$2 is namely cut out by the contacts 11—12 SKR3 in the boxes where this relay is operated, and in the calling alarm box by 17—18 SKR2 and 15—16 K1. To give highest possible tension to the relays SKR2 and SKR3 during the pulsation, the rectifier L$i$1 has been connected in the box farthest away from the station in order to prevent the current from flowing through D1. The speech equipment T is cut out by the contacts 15—16 SKR3 in the boxes nearer to the station than the calling box; and by 11—12, 13—14 SKR2 in the calling box for the subsequent boxes.

RL8 is again connected after the conclusion of the pulsation, and shows that the microtelephone of the calling alarm box is lifted by lighting up the lamp AL.

The dispatching of the call is carried out in the same way as in case of service calls. When the door of the alarm box is closed, the contacts 15—16 K1 are affected, again sending current through RL1, at which the pulsation is continued all the way to the box farthest away, where the ground connection is discontinued when the contacts 11—13 ÄR are broken. To connect relay ÄR the selector V has made one more impulse than the number of boxes connected on the branches. In this step the selector V lights up the final lamp SL. This indicates that no new call has been made during the time the described call was in progress. Should a new call have been made, the pulsation would have discontinued as before described when the calling box was reached and an identification lamp corresponding to the calling box would have been lit.

An emergency alarm bell can be connected by way of the contacts 17—18 AR2. A speech recording apparatus, for instance a tape recorder, can be connected via the contacts 11—12 RL12.

In order to receive about same current strength through the speech equipment in the alarm boxes, despite the relatively high current consumption of the relays SKR2 and SKR3, one of the resistances connected in series with the speech equipment is short-circuited by the contacts 15—16 SKR2.

$a$. In case of leakage to ground from any of the line branches, AR2 in the individual relay set operates in the same way as during an emergency call, irrespective to on what branch the leakage has appeared.

The common relay set is connected through operation of EO1 to position A. If there is a leakage in the a-branch, the contacts 32—33 RL1 (positive=RL1 32—33=restposition of selector=RL10=negative) are closed, at which relay RL10 operates, is held by its own contacts and lights the lamp "Avl. a." Leakage in the b-branch brings about a closing of 31—32 RL1 (center position of source of energy=RL14 11—12=RL11 12—11=RL3 14—13=RL1=EO3 15—14=ground= AR2 11—12=Br 15—14=EO4 33—32=AR3 18—19= RL14 16—15=RL11 29—28=RL8 winding II=RL5 winding II=negative E1) and RL9 operates (positive= RL1 32—31=RL11 16—15—19ö—19=RL9=negative) and lights the lamp "Avl. b." In both cases, the switch EO4 is to be put in position A, disconnecting the ground connection of the source of energy (E2). In this way all calls will be indicated as service calls.

b. In case of short-circuit between the branches, relay AR1 operates as for service calls. At break of one of the branches, the winding III dominates and causes the relay to operate.

The common relay set is connected by putting EO1 in position A. The relays RL5 and RL8 are both operated in case of short-circuit, closing the contacts 32—33. Operation of RL5 in turn leads to operation of RL14 (positive=EO3 12—13=RL5 32—33=RL7 11—12=RL14= RL11 22—21=RL9 17—18=negative), which cuts off the operation current source of RL7 and prevents its operation. If there is a break on one of the branches, the winding III of RL8 becomes the strongest, causing RL14 to operate after receiving current via the contacts 31—32 RL8. When RL14 in both these cases operates, the lamp FL is lit. The switch EO4 is thrown over to position B, at which the branches are joined and the source of energy E2 is connected between the two branches and ground in series with the windings I and II of AR1. The ground connection to the center point of the source of energy is cut off, and further a resistance $r7$ is connected to the winding III of AR1. The resistance is adapted to counter-act the line current through the rectifiers L$i$2 in the blocking direction of the boxes. Service calls are received when 11—12 K2 is closed, and emergency calls momentarily when 11—12 K1 is closed and remaining when thereafter 11—12 K2 is closed, at which AR1 operates (positive E2=AR1 winding I=AR3 14—15=EO4 36—35=a- and b-branches in parallel=(SKR4 is affected via L$i$3 and K2 12—11)=K2 13—14=T (in the box)=K2 12—11=SKR3 16—15=$r$2=$r$1=SKR4 16—17=ground =EO4 31—32=AR3 18—17=AR1=negative). When EO1 then is put in position A, RL14 operates as described above and connects the polarized relay RL13, which operates (positive E1=RL13=RL14 19ö—19=AR3 16—15=EO4 36—35=a- and b-branches in parallel=SKR4 12—11=K2 13—14=T (in the box)=K2 12—11= SKR3 16—15=$r$2=$r$1=SKR4 16—17=ground=RL14 29ö—29=negative E1) and lights the lamp AL. The calls are dispatched as service calls.

Calls via a line with leakage to ground are often disturbed by ground interference, chiefly in the form of noise. These disturbances can be eliminated by connecting a condensor in parallel with the speech equipment which can be done by manipulating the switch SO of the common relay set, and also through the condensor C2 in the alarm boxes, which the relay SKR4 connects in parallel with the speech equipment.

By using the instruments available in the test equipment box (see separate description), measurements can be made which indicate the nature of the line faults.

In order to send a police flash signal the selector switch in the individual relay set is put in its final position, connecting the relay BR to positive. When BR operates, the line branches are cut off from the source of energy E2 and instead connected to an alternating current source. When the branches are disconnected from the source of energy E2, the winding III of the relay AR1 becomes dominating, the relay operates and lights the lamp AL1. The alternating current connected to the line branches passes through the condensor C3 in the boxes, is rectified in the rectifier L$i$4 and causes the relay SKR1 to operate. This relay is equipped with a mercury contact connected to the net in series with the box lamp SKL and the outer lamp YL. Both are consequently extinguished when the relay SKR1 operates.

The relay BR breaks, however, its negative with the contacts 17—18 and is released with delayed action, depending on the condensor C4, connected in parallel with the winding of the relay. The relay accordingly pulsates slowly, causing the lamps SKL and YL of the boxes and AL1 of the individual relay set to blink in time with the impulses.

When an automatic fire alarm is to be connected, a special relay set is required for the box where the connection is made and also for the lamp panel at the station.

Fault signals from an automatic fire alarm system are carried forward by having the fault relay at the automatic fire alarm central, when released, to operate a relay in the special relay set of the alarm box. This relay in turn originates an emergency call which discontinues after a certain time. The identification lamp of the box is marked, for instance, "7 Fault Alarm."

Fire alarm signals are carried forward by having the fire alarm relay at the automatic fire alarm central, when released, to operate another relay in the special relay set of the box. This relay causes an emergency call to be made, thereafter connecting a resistance, equal to the resistance of the speech equipment when connected between the branches. This is indicated at the central as an emergency call and a lifting of the micro-telephone, which functions are recorded by the special relay set of the lamp panel, lighting a lamp marked, for instance "7 Fire Alarm."

Figure 19:
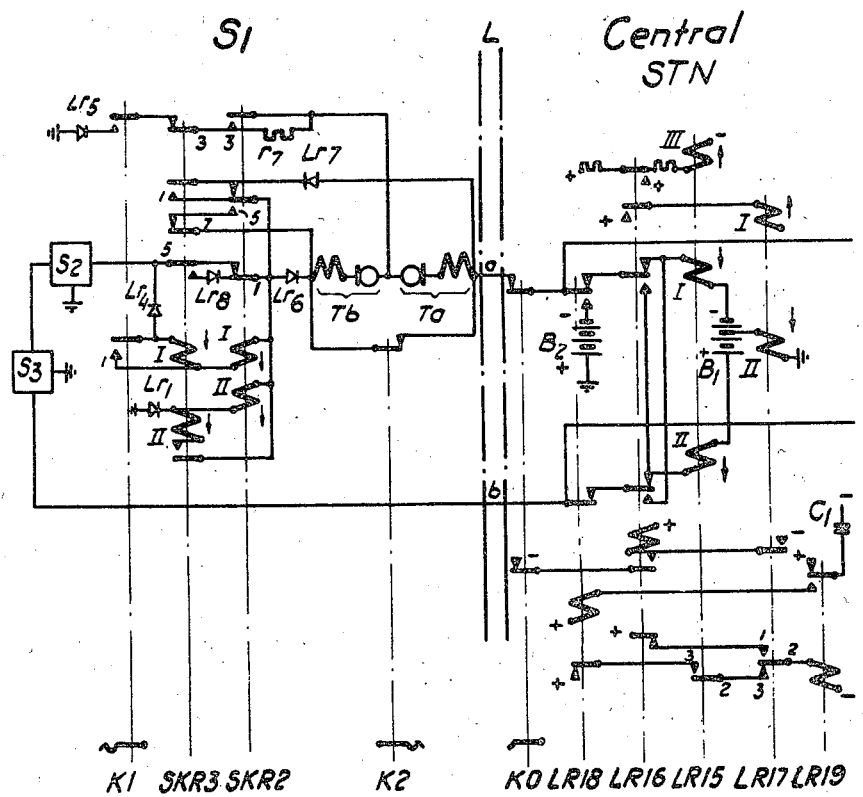

The arrangement in Fig. 19

Figure 17:
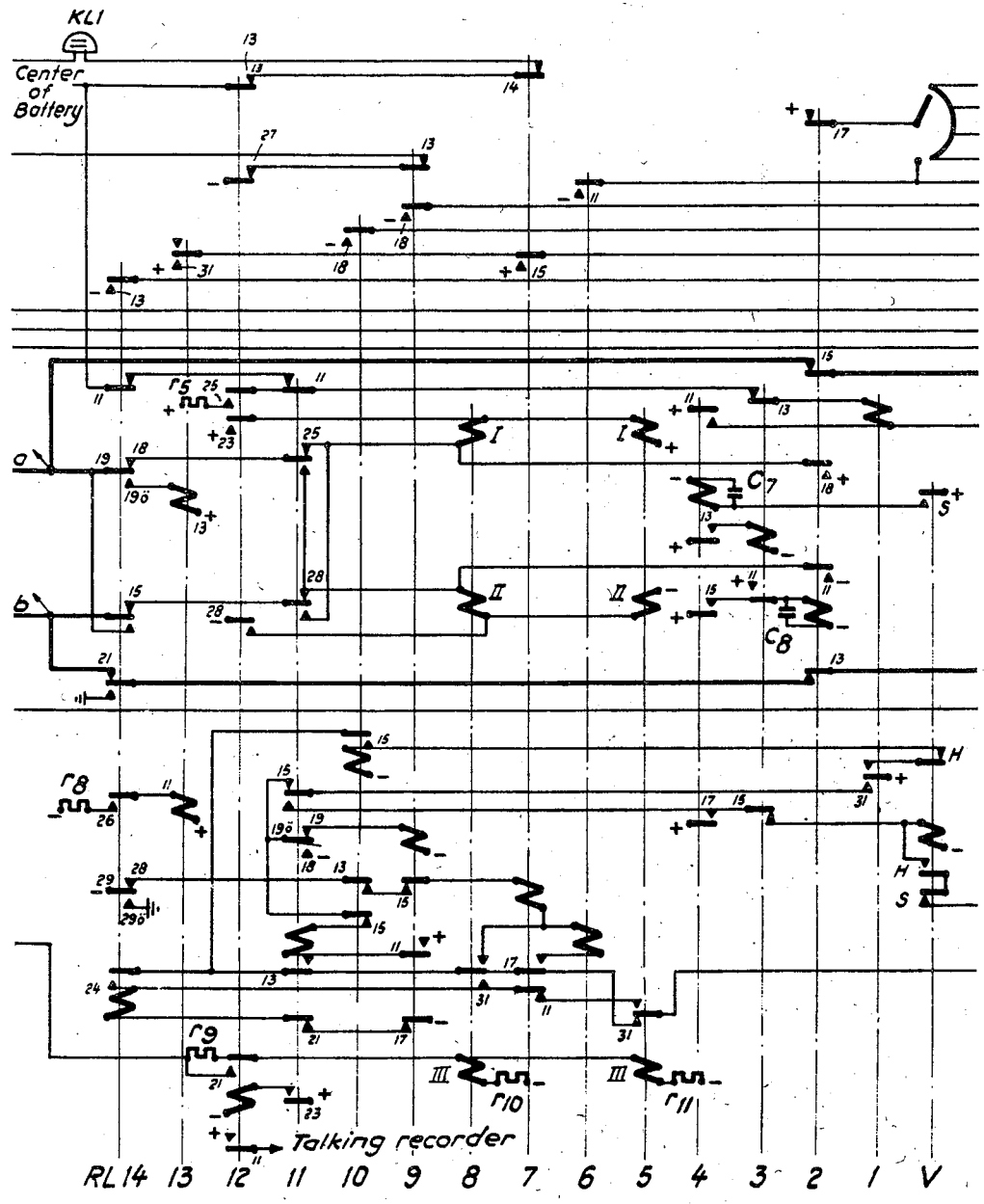
Figure 18:
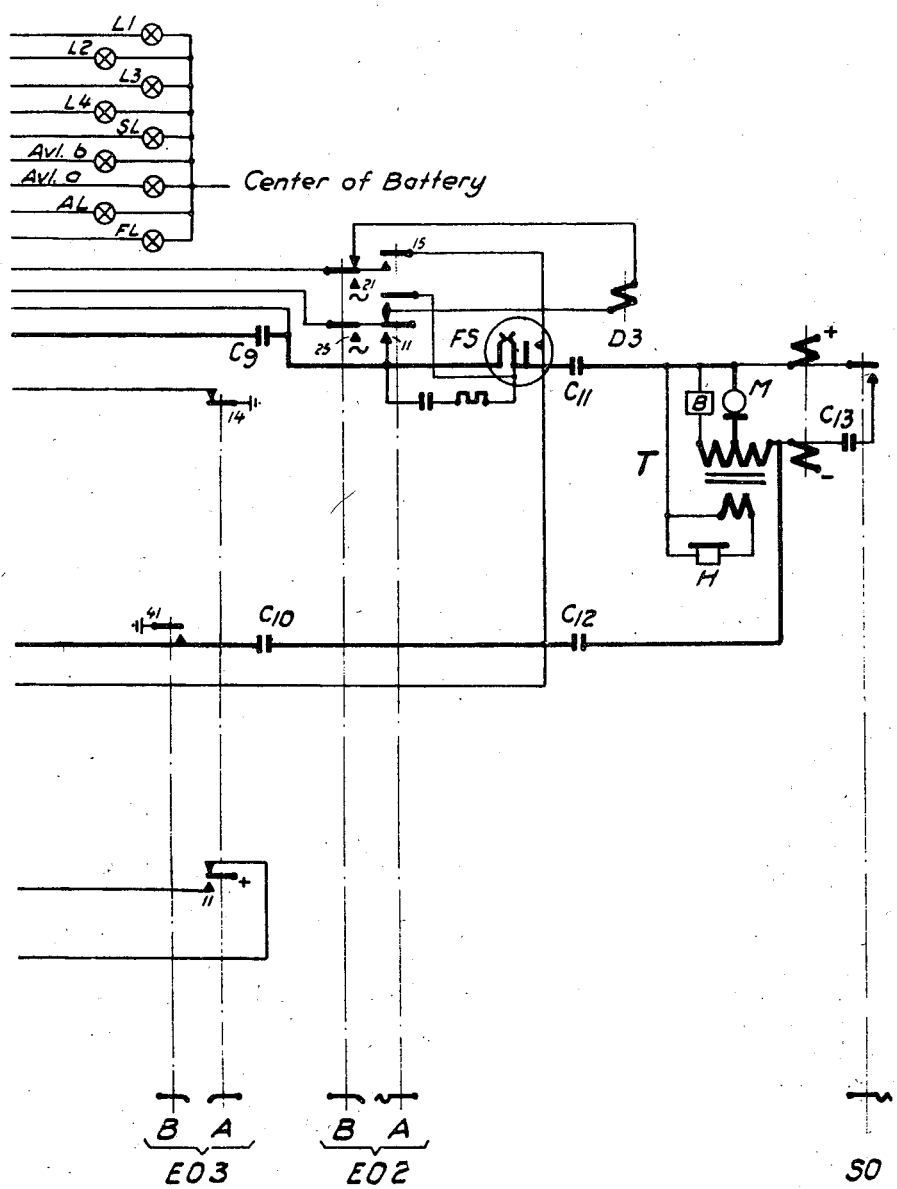

Fig. 19 shows the facilities at the central station in somewhat simplified version when compared with Figs. 17 and 18. Thus, the for each line individual relay sets have been eliminated and the common relay set has been simplified by excluding the keys EO2 and EO3. The line has been connected direct to the simplified relay set.

Fig. 19 shows three boxes S1, S2 and S3, with S1 in detail. The arrangements at the central STN are similar to the arrangements according to Figs. 12–15. By an ordinary call the hook contacts K2 are operated and connect the speech equipments T$a$ and T$b$ and increase the resistance in the loop. The relay LR15 which is connected so as to close the contacts 12—13 is operated, allowing the call to be handled as in Figs. 12–15.

By priority calls the contact device K1 is operated, connecting ground via the resistance R7 to the line branch $a$. At this current flows through relay LR7 which operates. LR7 in turn operates LR19 and LR16. LR19 connects the normally charged condenser C1 to LR18 and the charge of the condenser momentarily operates LR18. Relay LR16 reverses the line loop, disconnecting the speech equipment T$a$ and T$b$ of all boxes through the rectifiers L$r$6 and L$r$7. Relay LR18 connects a source of energy B2 between the outgoing loop lead $a$ and ground with the negative side to $a$. Current flows through the winding of the SKR2 relay, which is connected in the box on the $a$-branch nearest to STN, and it operates. The rectifier L$r$4 and (1—2) SKR2 blocks the current for the SKR2-relays of the other boxes. When relay LR18 again is released both SKR2 and SKR3 receive current through their windings I, because (1—2) SKR2 is cut off. At this SKR2 is held and SKR3 operates. Because of the breaking off of (3—4)

SKR3 are priority calls from the box prevented. Contact (5—6) SKR3 bypasses (1—2) SKR2 and when LR15 again is operated, that is by the next impulse, SKR2 in the next box receives current through the rectifier L*r*8 and operates. When the impulse again discontinues, SKR3 in the latter box operates and bypasses (1—2) SKR2 also in this box. In this way the impulses are carried forward until relay SKR2 of the box from which the emergency call was made has been operated. During the pulsation relay L*r*19 is receiving current through a break contact on LR18 over (2—3) LR17, because when LR15 was operated relay LR17 received current in the opposing winding I, was operated and made contact 2—3. When the calling box now is known and (1—2) SKR3 has been operated, the resistance *r*7 is short-circuited and the current increases through the winding II of LR17 operating it again and breaking off the pulsation circuit to LR19. In the box from which the call was made the contact (1—2) K1 has short-circuited the operation winding of L SKR3 preventing this relay from operating. Thus the rectifiers L*r*6 and L*r*7 are cut out by the contacts (5—6—7) SKR2 and (1—2—7—8) SKR3 connecting the speech equipment T*a*—T*b* of only this box.

When the call is ended and K1 is restored, the relay SKR3 in the box in question is operated and connects the following boxes (5—6 SKR3 closed). The pulsation then continues if a priority call has been made from any of the following boxes. Release is made through momentary operation of the key K*o*. If relay LR15 is of polarized type and is given an opposing winding, it can indicate the change in resistance in the line loop which takes place when K2 in a priority calling box is operated, resulting in lamp indication for this box. Concerning lamp indication in other respects reference is made to Fig. 17. LR18 moves the selector V forward by way of a contact not shown in Fig. 17.

*Incoming calls to the alarm boxes*

A call to a certain alarm box which is furnished with a bell RK and a seriecondenser is possible either from the test-jacks with a telephone apparatus equipped with signalinductor and means for current feeding, or also the central installation can be combined with a register, Figs. 22–23, which by means of a dial and key at the desk selects the alarm box in question and connects contact 11 on corresponding relay BR to positive which causes the alarmbox to be connected to a disengaged connecting link. Ring signal is given from the connecting link which in this case is equipped with one on the *a*- and *b*-branches connected ring key.

The leads *a* and *b*, Figs. 22–23, are connected to a dial, suitably with the switch VO in a connecting link. When the number of the alarm box is dialed, the crossbar switch KV is put up in the following manner: The first figure steps up the selecting magnets STM0—STM9 through the relays R1, R2, R3 and R4 in the usual way. When the relay R3 is released after dialing of the figures is enclosed, the holding magnet BRM0 is getting current through the following circuit: positive (11—12) R3— (13—14) R4— (16—17) R7— (16—17) BRM0— negative, and is actuated. This is giving the relay R6 current through the following circuit: positive— (13—14) BR— (11—12) BRM0— (13—14) R7—R1— (11—12) R4— negative. The contacts (11—12) R6 are broken and the selecting magnets, the relays R4 and R5 and thereafter R6 are released. BRM0 receives holding current via its own contacts (15—17). When dialing of the second figure begins, the relay R3 is actuated and the contacts (13—15) make, the top winding on relay R7 is getting current and this relay is actuated. When the dialing of the figure is concluded and relay R3 is released, BRM1 is getting current via (17—18) R7 and operates. The selecting magnets and the relays R4, R5 and R6 are then released. When the dialing of the third figure begins, the relay R7 is released because the contacts (14—15) R3 breaks the current to its holding winding, and (13—14) BRM, breaks the current to its operation winding. Then BRM2—BRM5 actuates, when relay R4 is released at the end of third figure. The relay BR (Fig. 9), whose number has been dialed, is now getting current via the multiple contacts of the holding bars BRM1—BRM5 in the crossbar switch KV. These contacts have connections to all the BR—relays. As is evident from what has been said above and from the numbering on the multiple of the crossbar switch, the hundreds are stored by BRM0, the tens by BRM and the units by BRM2—BRM5.

When LR operates by current from (11—12) BR, selection is made to a disengaged connecting link as previously described. In series with this current circuit, also R8 gets current and actuates, as does R9. After the selection, when BR operates to *a*-position, the current circuit to the multiple and to relay R8 is broken by the contacts (11—12) BR1, at which R8 actuates and R9 is de-energized. During the delayed action of the relay R9 the contacts (11—12) and (13—14) are broken. This cuts off the current to all selecting and holding magnets and to the relays R4—R5—R6—R7 and R8 and they release. A ring signal to the box can be transmitted by one to the *a*- and *b*-branches connected key in the connecting link (not shown in the figure). It is of course possible to arrange also for an automatic ring signal and disconnection in the usual way. Similarly, the call can be forced to go in on a pre-determined connecting link if the others are barred, for instance by breaking off the current circuit to one of the busy test relays (S10—S11 Fig. 9), at the same time as it is controlled by a separate current circuit that relay S9 is correctly set.

I claim:

1. In an alarm signal system a number of alarm boxes, which comprises a speech equipment and a selecting means, a central installation, lines common to a number of said boxes for connecting the same with said central installation, an impedance, which is of a high ohmic value compared with the speech equipment and connected to the line at the farthest end from the central installation, the said central installation having a line relay device for each of the connected lines, and at least one connecting link combined with an impulsing device and common to a number of the said relay devices, and switching devices for connecting an arbitrary line to a connecting link, the said relay devices including a source of current and at least one relay providing rest current control of the line over the said impedance and having contact means operable by break in the line when the rest current vanishes and by operating of the means to connect the said speech equipment to the line, the said contact means comprising contacts to operate the switching device, the said impulsing device connected to the line over the connecting link in order to operate the selecting means in the boxes, which device is operated to connect only one by one in turn of the said speech equipment in the respective boxes to the same line.

2. In an alarm signal system a number of alarm boxes, which comprises a speech equipment and contact means to connect said speech equipment to the line by calling, a central installation, lines common for a number of said boxes for connecting the same with said central installation, the said central installation having a line relay device for each of the connected lines and at least one connecting link combined with an impulsing device and common to a number of the said relay devices, and switching devices for connecting an arbitrary line to a connecting link, the said relay devices including a source of current and at least one relay providing contact means, operable by operating of the means which connect the said speech equipment to the line for starting of the said switching device, the said boxes and the central installation comprising selecting means to connect only one by one in turn of the said boxes, all connectible to the same line, the said box selecting means comprising two relays in each box, one of the said relays connected between one of the line branches and ground and the other relay between the other line branch and contacts on the first named relay, the said impulsing means in the central installation comprising contacts for connecting the source of current at first between the first named line branch and ground to operate the first named relay and contacts, which thereafter connect the source of current between the both branches of the line to operate the second selecting relay in the box, the first named selecting relay comprising contacts to break the line circuit to the boxes connected to the line farther away from the central installation, the second named selecting relay comprising contacts to disconnect the speech equipment in this box from the line and contacts which again connects the line to the boxes situated farther away from the central installation.

3. In an alarm signal system a number of alarm boxes, which comprises a speech equipment, a central installation, lines common for a number of said boxes for connecting the same with said central installation, an impedance, which is of a high ohmic value compared with the speech equipment, and connected to the line at the farthest end from the central installation, the said central installation having a line relay device for each of the connected lines, and at least one connecting link common to a number of the said relay devices, and switching devices for connecting an arbitrary line to a connecting link, the said relay devices including a source of current and at least one relay providing rest current control of the line over the said impedance and having contact means operable by break in the line when the rest current vanishes and by operating of the means to connect the said speech equipment in the line, the said contact means comprising contacts to operate the switching means, the said boxes and the central installation comprising selecting means to connect only one by one in turn of the said boxes, all connectible to the same line, the said lines being double-wired and with substantially the same capacity between each of the branches and ground, and the said selecting means in the boxes connected between the branches and to ground.

4. In an alarm signal system a number of alarm boxes, which comprising a speech equipment, a central installation, line loops consisting of one wire common for a number of said boxes for connecting the same with said central installation, the said boxes also comprising contact means to connect the said speech equipment in series with said line loop, the said central installation having a line relay device for each of the connected lines, and at least one connecting link common to a number of the said relay devices, and switching devices for connecting an arbitrary line to a connecting link, the said relay devices including a source of current and at least one relay providing rest current control of the line and having contact means operable by break in the line when the rest current vanishes and by operating of the means to connect the said speech equipment in the line, the said contact means comprising contacts to operate the switching means, the said boxes and the central installation comprising selecting means to connect only one by one in turn of the said boxes, all connectible to the same line, and the said selecting means in the boxes connected in series with the loop and to ground.

5. In an alarm signal system a number of alarm boxes, which comprising speech equipment and an impedance, which is of a high ohmic value compared with the speech equipment, a central installation, lines for connecting said boxes with said central installation, the said central installation having a line relay device for each of the connected lines, and at least one connecting link common to a number of the said relay devices, and switching devices for connecting an arbitrary line to a connecting link, the said relay devices including a source of current and at least one relay providing rest current control of the line over the said impedance and to operate by calling and break in the line, the said boxes and the central installation comprising coupling means operable by break of the line and comprising contact means to alter the connection of the speech equipment in the boxes from between the both line branches to between at least one of them and ground.

6. In an alarm signal system as claimed in claim 5 in which the central installation comprising a speech equipment and the coupling means in the central installation operable by break of the line comprising contacts to alter the connection of the speech equipment in the central installation from between the both line branches to between at least one of them and ground.

References Cited in the file of this patent
UNITED STATES PATENTS

| | | |
|---|---|---|
| 1,740,123 | Snyders et al. | Dec. 17, 1929 |
| 1,930,525 | Levy | Oct. 17, 1933 |
| 2,062,822 | Powell | Dec. 1, 1936 |
| 2,121,159 | Lomax | June 21, 1938 |
| 2,122,460 | Ffolliot | July 5, 1938 |
| 2,195,627 | Lomax | Apr. 2, 1940 |
| 2,211,111 | Griffins | Aug. 13, 1940 |
| 2,236,822 | Hershey | Apr. 1, 1941 |
| 2,615,972 | Hubbard | Oct. 28, 1952 |
| 2,690,477 | Friedmann | Sept. 28, 1954 |